(12) United States Patent
Komura et al.

(10) Patent No.: US 8,369,192 B1
(45) Date of Patent: *Feb. 5, 2013

(54) THERMALLY-ASSISTED MAGNETIC RECORDING HEAD, HEAD GIMBAL ASSEMBLY AND MAGNETIC RECORDING DEVICE

(75) Inventors: Eiji Komura, Tokyo (JP); Koji Shimazawa, Tokyo (JP); Tsutomu Chou, Tokyo (JP); Shinji Hara, Tokyo (JP); Daisuke Miyauchi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/298,360

(22) Filed: Nov. 17, 2011

(51) Int. Cl.
*G11B 11/00* (2006.01)
(52) U.S. Cl. ............................ 369/13.33; 369/112.27
(58) Field of Classification Search .............. 369/13.33, 369/13.32, 13.24, 13.14, 13.03, 13.02, 13.12, 369/112.27, 112.09, 112.14, 13.35; 360/59, 360/313, 125.31, 125.74
See application file for complete search history.

(56) References Cited

U.S. PATENT DOCUMENTS 8,000,178 B2 * 8/2011 Shimazawa et al. ........ 369/13.33
8,208,349 B2 * 6/2012 Tanaka et al. ............... 369/13.33

OTHER PUBLICATIONS

U.S. Appl. No. 13/097,133, filed Apr. 29, 2011, Miyauchi et al.

* cited by examiner

*Primary Examiner* — Ali Neyzari
(74) *Attorney, Agent, or Firm* — Posz Law Group, PLC

(57) ABSTRACT

A thermally-assisted magnetic recording head enables even steeper magnetization reversal between adjacent magnetic domains of a magnetic recording medium and satisfies the demand for high SN ratio and high recording density. The thermally-assisted magnetic recording head includes a pole that generates a writing magnetic field from an end surface that forms a part of an air bearing surface that opposes a magnetic recording medium, a waveguide through which light for exciting surface plasmon propagates, and a plasmon generator that couples to the light in a surface plasmon mode. The plasmon generator has a plane part and a projection part, the pole has a projection part opposing surface that opposes the projection part, and the distance between the projection part opposing surface and the projection part is 10-40 nm.

14 Claims, 13 Drawing Sheets

THERMALLY-ASSISTED MAGNETIC RECORDING HEAD, HEAD GIMBAL ASSEMBLY AND MAGNETIC RECORDING DEVICE

BACKGROUND OF THE INVENTION

1. Field of the Invention

The present invention relates to a head that is used for a thermally-assisted magnetic recording that irradiates near-field light to a magnetic recording medium to decrease an anisotropy field of the magnetic recording medium and then performs data recording, and to a head gimbal assembly and a magnetic recording device to which the head is used.

2. Description of the Related Art

In the field of magnetic recording using a head and a medium, further performance improvements of thin film magnetic heads and magnetic recording media have been demanded in conjunction with a growth of high recording density of magnetic disk devices. Currently, composite type thin film magnetic heads are widely used for the thin film magnetic heads. The composite type thin film magnetic heads are configured with a configuration in which a magnetoresistive (MR) element for reading and an electromagnetic transducer element for writing are laminated.

The magnetic recording medium is a discontinuous medium in which magnetic nanoparticles gather and each of the magnetic nanoparticles has a single-magnetic-domain structure. In this magnetic recording medium, one recording bit is configured with a plurality of magnetic nanoparticles. Therefore, in order to increase recording density, asperities at a border between adjacent recording bits need to be reduced by decreasing the size of the magnetic nanoparticles. However, decreasing the size of the magnetic nanoparticles leads to a decrease in the volume of the magnetic nanoparticles, and thereby drawbacks that thermal stability of magnetizations in the magnetic nanoparticles decreases occur.

As a countermeasure against this problem, increasing magnetic anisotropy energy Ku of magnetic nanoparticles may be considered; however, the increase in Ku causes an increase in an anisotropy field (coercive force) of the magnetic recording medium. On the other hand, the upper limit of the writing magnetic field intensity of the thin film magnetic head is mostly determined by saturation magnetic flux density of a soft magnetic material configuring a magnetic core in the head. As a result, when the anisotropy field of the magnetic recording medium exceeds an acceptable value determined by the upper limit of the writing magnetic field intensity, it becomes impossible to perform writing. Currently, as a method to solve such thermal stability problem, a so-called thermally-assisted magnetic recording method has been proposed in which, while a magnetic recording medium formed of a magnetic material with large Ku is used, the magnetic recording medium is heated immediately before the application of a writing magnetic field so that the anisotropy field is reduced and the writing is performed.

As this thermally-assisted magnetic recording method, a method that uses a near-field light probe (a so-called plasmon-generator), which is a metal piece that generates near-field light from plasmon excited by laser light, is generally known.

As a magnetic recording head provided with such plasmon generator, a magnetic recording head provided with a pole, a waveguide, and a plasmon generator having a propagation edge opposing the waveguide has been already proposed by the inventors of the present application. Specifically, a magnetic recording head is proposed in which from the perspective of the air bearing surface side, heat dissipation layers respectively continue to trailing side end parts of a substantially V-shaped portion of the plasmon generator which has the substantially V-shaped part that is formed with a propagation edge positioned on the leading side and in which a part of the pole is contained in a space formed by the V-shaped part (U.S. patent application Ser. No. 13/046,117).

In this thermally-assisted magnetic recording head, light propagating through the waveguide is coupled with a plasmon generator in a surface plasmon mode to excite surface plasmon and then the surface plasmon propagates through the plasmon generator, so that the near-field light is generated at the near-field light generating portion positioned at an air bearing surface (ABS) side end part of the propagation edge. Furthermore, a magnetic recording medium is heated by the near-field light generated in the near-field light generating portion of the plasmon generator and a magnetic field is applied in a state where an isotropic magnetic field of the magnetic recording medium is reduced, and thereby information is written. In the above-described thermally-assisted magnetic recording head, a method that allows steep magnetization reversal between adjacent magnetic domains of the magnetic recording medium and that satisfies the demand for high recording density and high signal to noise (SN) ratio is shortening the distance between the center of near-field light irradiated to the magnetic recording medium and the center of the magnetic field applied from the pole, that is, in other word, shortening the distance between the near-field light generating portion and a tip end part (the end part positioned on the most leading side on the air bearing surface side) of the pole.

In order to shorten the distance between the near-field light generating portion and the tip end part of the pole in the magnetic recording head with the above-described configuration, it is necessary to thin the thickness of a substantially V-shaped part of the plasmon generator. However, with the thinned thickness, light is absorbed by the pole contacting the substantially V-shaped part, and this may reduce light intensity of the near-field light that emits from the near-field light generating portion. As a result, a preferred thermally-assisted effect may not be obtained. On the other hand, when the thickness of the substantially V-shaped part of the plasmon generator is thickened to obtain sufficient light intensity of the near-field light, the distance between the near-field light generating portion and the tip end part of the pole is lengthened, and this may bring difficulties to satisfy the demand for high recording density and high SN ratio.

In such a situation, due to the demand for even higher recording density in recent years, there is a current situation in which the demand for the thermally-assisted magnetic recording head has risen, the thermally-assisted magnetic recording head having a reduced spot size of near-field light irradiated to the magnetic recording medium to enable even steeper magnetization reversal between adjacent magnetic domains of the magnetic recording medium and satisfying the demand for higher SN ratio and higher recording density.

SUMMARY OF THE INVENTION

The object of the present invention is to provide a thermally-assisted magnetic recording head that has a reduced spot size of near-field light irradiated to the magnetic recording medium to enable even steeper magnetization reversal between adjacent magnetic domains of a magnetic recording medium and that satisfies the demand for high SN ratio and high recording density, and a head gimbal assembly and a magnetic recording device using the thermally-assisted magnetic recording head.

In order to achieve the above object, the present invention provides a thermally-assisted magnetic recording head includes a pole that generates a writing magnetic field from an end surface that forms a part of an air bearing surface that opposes a magnetic recording medium, a waveguide through which light for exciting surface plasmon propagates, and a plasmon generator that couples to the light in a surface plasmon mode to generate near-field light from a near-field light generating end surface that forms a part of the air bearing surface, wherein the waveguide is arranged on a back side of the pole along a direction perpendicular to the air bearing surface from the perspective of the air bearing surface side, the plasmon generator has a plane part and a projection part that is projected from the plane part to the waveguide side and that opposes the pole and the waveguide with a predetermined gap therebetween, the pole has a projection part opposing surface that opposes the projection part, and the distance between the projection part opposing surface and the projection part is 10-40 nm (first invention).

For the first invention, it is preferred to include a nonmagnetic metal part that contacts the pole (second invention). For the second invention, it is preferred that another nonmagnetic metal part contacting the pole is included and that the nonmagnetic metal parts are arranged to contact both of the side surfaces of the pole in a track width direction from the perspective of the air bearing surface side (third invention), and that the nonmagnetic metal part contacts the plane part of the plasmon generator (fourth invention).

For the first invention, it is preferred that a light penetration suppression part that may suppress penetration of the near-field light is provided on the projection part opposing surface (fifth invention). For the fifth invention, it is preferred that the light penetration suppression part is a metal thin film with a thickness of 0.5-6.25 nm, and that the light penetration suppression part is configured of a metal material whose attenuation coefficient is larger than that of a metal material configuring the plasmon generator (seventh invention), and that the metal material that configures the light penetration suppression part is aluminum, magnesium, indium, or tin, or an alloy material including at least one type of these metals (eighth invention).

For the first invention, it is preferred that the projection part continues from the air bearing surface along the direction perpendicular to the air bearing surface (ninth invention).

For the first invention, it is possible that the shape of the projection part is a substantially trapezoidal shape that is surrounded by a short side that is positioned on the air bearing surface, a long side that is positioned on the back side with respect to the short side along the direction perpendicular to the air bearing surface and that is substantially parallel to the short side, and two inclined sides that respectively continue to end parts of the short side and end parts of the long side (tenth invention). In such a case, it is preferred that an angle formed by the direction perpendicular to the air bearing surface and one of the inclined sides is less than 10 degree (eleventh invention).

For the first invention, it is possible that the shape of the projection part includes a substantial V-shape formed by an apex that is positioned on the air bearing surface and two inclined sides that spread to each other from the apex toward the back side along the direction perpendicular to the air bearing surface (twelveth invention).

Further, the present invention provides a head gimbal assembly includes the thermally-assisted magnetic recording head discussed above, and a suspension that supports the thermally-assisted magnetic recording head (thirteenth invention).

Furthermore, the present invention provides a magnetic recording device includes a magnetic recording medium, the thermally-assisted magnetic recording head discussed above, and a positioning device that supports the thermally-assisted magnetic recording head and that also positions the thermally-assisted magnetic recording head with respect to the magnetic recording medium a magnetic recording medium (fourteenth invention).

According to the present invention, it is possible to provide a thermally-assisted magnetic recording head that has a reduced spot size of near-field light irradiated to the magnetic recording medium to enable even steeper magnetization reversal between adjacent magnetic domains of a magnetic recording medium and that satisfies the demand for high SN ratio and high recording density, and a head gimbal assembly and a magnetic recording device using the thermally-assisted magnetic recording head.

DESCRIPTION OF THE PREFERRED EMBODIMENTS

Prior to explaining embodiment of the present invention, terminologies used in the present specification are defined. In a lamination structure or an element structure formed on an element formation surface of a slider substrate of a magnetic recording head according to embodiment of the present invention, from a perspective of a reference layer or a reference element, a substrate side is referred to as "lower (below)" and an opposite side to the substrate side is referred to as "upper (above)." In addition, in the magnetic recording head according to embodiment of the present invention, "X, Y and Z axis directions" are defined in some of the drawings as necessary. Here, the Z axis direction corresponds to the above-described "up and down directions", +Z side corresponds to a trailing side, and −Z side corresponds to a leading side. Moreover, the Y axis direction is a track width direction, and the X axis direction is a height direction A thermally-assisted magnetic recording head according to one embodiment of the present invention is explained with reference to the drawings.

Figure 1:
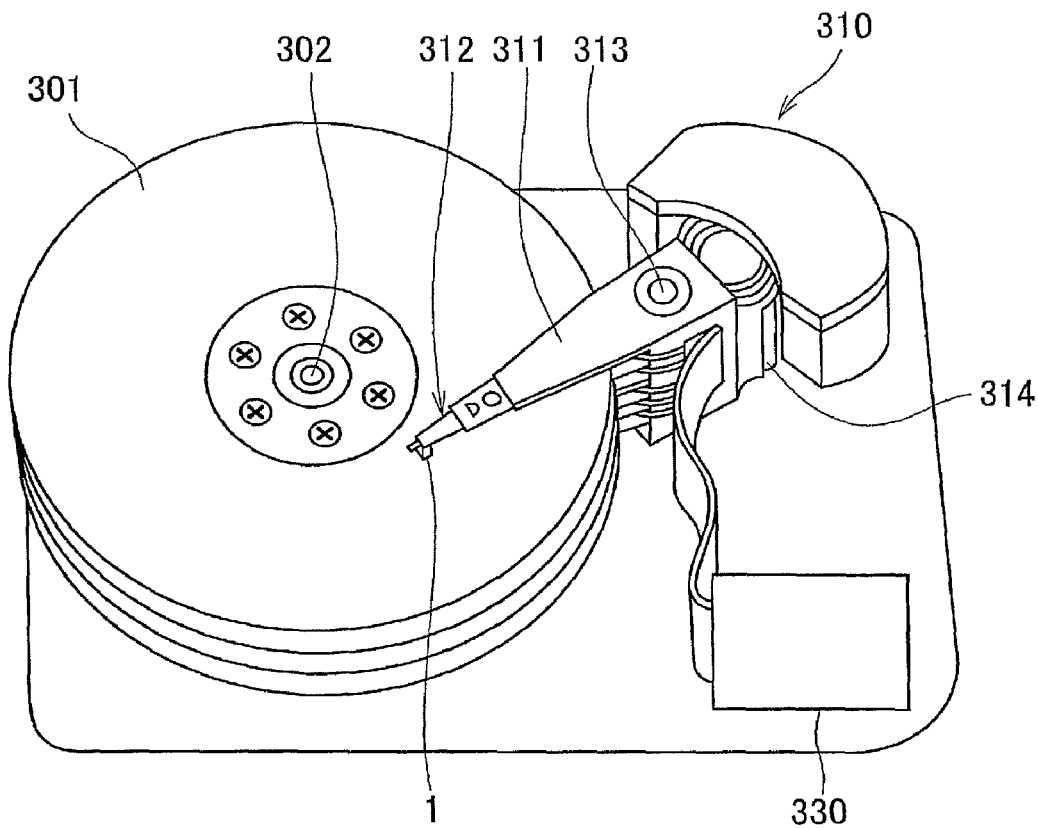
FIG. 1 is a perspective view schematically illustrating a magnetic recording device according to an embodiment of the present invention.
Figure 2:
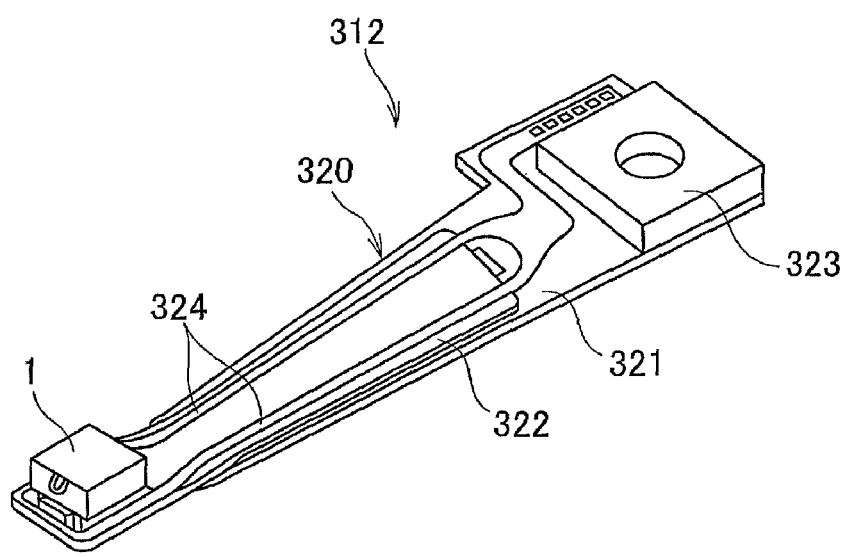
FIG. 2 is a perspective view schematically illustrating a head gimbal assembly (HGA) according to the embodiment of the present invention.
Figure 3:
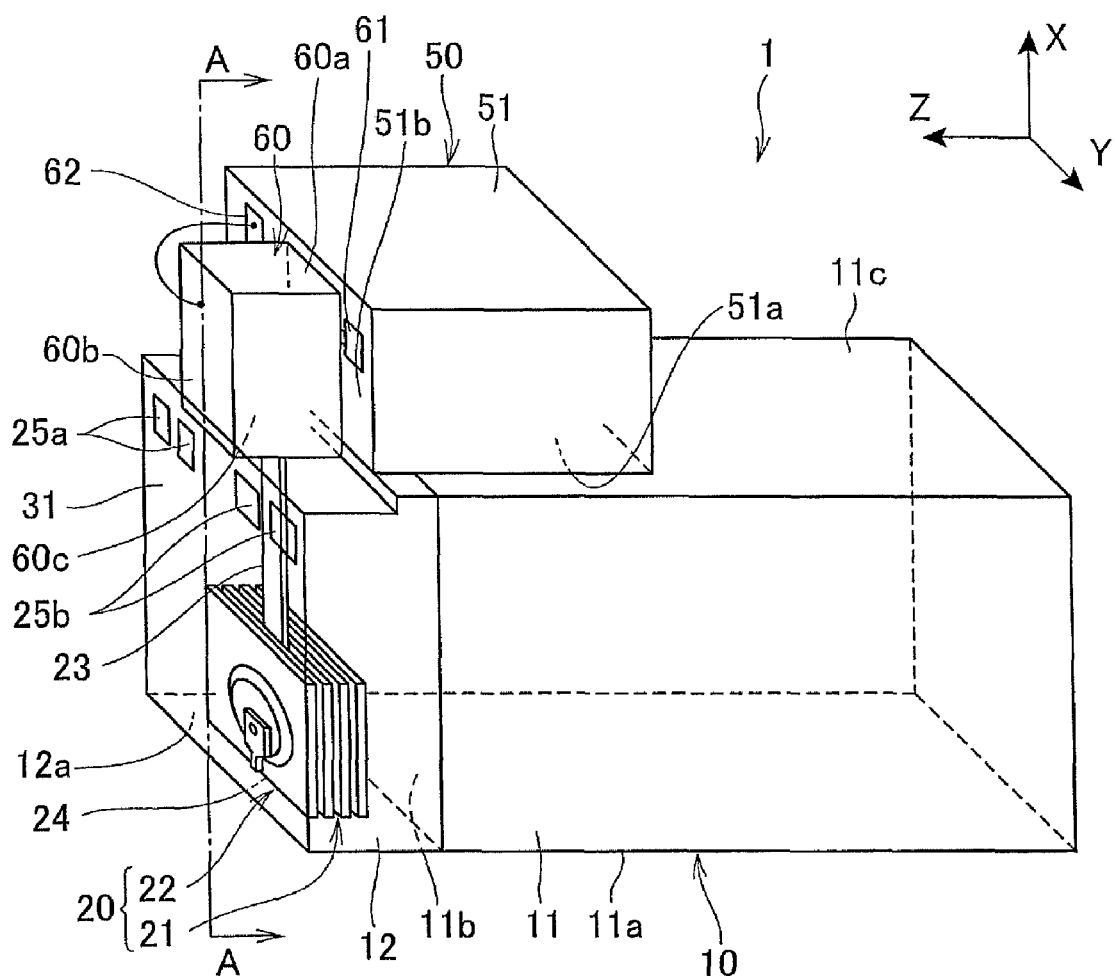
FIG. 3 is a perspective view illustrating a thermally-assisted magnetic recording head according to the embodiment of the present invention.

FIG. 1 is a perspective view schematically illustrating a magnetic recording device of the present embodiment. FIG. 2 is a perspective view schematically illustrating a head gimbal assembly (HGA) of the present embodiment. FIG. 3 is a perspective view illustrating a thermally-assisted magnetic recording head according to the present embodiment.

As illustrated in FIG. 1, a magnetic disk device as a magnetic recording device in the present embodiment is provided with a number of magnetic disks 301, an assembly carriage device 310, head gimbal assemblies (HGA) 312, and a control circuit 330. The magnetic disks 301 rotate around a rotational shaft of a spindle motor 302. The assembly carriage device 310 is provided with a plurality of drive arms 311. Each of the HGAs 312 is attached to a tip portion of one of the drive arms 311 and has the thermally-assisted magnetic recording head 1, which is a thin film magnetic head, according to the present embodiment. The control circuit 330 controls writing and reading operations of the thermally-assisted magnetic recording head 1 according to the present embodiment and controls a light emission operation of a laser diode, which is a light source that generates laser light for after-mentioned thermally-assisted magnetic recording.

In the present embodiment, the magnetic disk 301 is for perpendicular magnetic recording and has a structure in which a soft magnetic under layer, an intermediate layer, and a magnetic recording layer (perpendicular magnetization layer) are sequentially laminated above a disk substrate.

The assembly carriage device 310 is a device for positioning the thermally-assisted magnetic recording head 1 above a track, the track being formed in the magnetic disk 301 and having recording bits arrayed. In the assembly carriage device 310, the drive arms 311 are stacked in a direction along a pivot bearing shaft 313 and are angularly swingable by a voice coil motor (VCM) 314 centering around the pivot bearing shaft 313.

Note, the structure of the magnetic disk device of the present embodiment is not limited to the above-described structure but may include only a single piece of each of the magnetic disk 301, the drive arm 311, the HGA 312, and the thermally-assisted magnetic recording head 1.

In the HGA 312 illustrated in FIG. 2, a suspension 320 includes a load beam 321, a flexure 322 that is firmly attached to the load beam 321 and has elasticity, and a base plate 323 provided at a base of the load beam 321. In addition, a wiring member 324 is provided on the flexure 322. The wiring member 324 is formed from a lead conductor and connection pads that are electrically connected to both sides of the lead conductor. The thermally-assisted magnetic recording head 1 according to the present embodiment is firmly attached to the flexure 322 at a tip end portion of the suspension 320 so as to oppose a surface of each of the magnetic disks 301 with a predetermined gap (flying height). Further, an end of the wiring member 324 is electrically connected to a terminal electrode of the thermally-assisted magnetic recording head 1 according to the present embodiment. Additionally, the structure of the suspension 320 in the present embodiment is also not limited to the above-described structure, and a head drive IC chip (not illustrated) may be mounted in the middle of the suspension 320.

As illustrated in FIG. 3, the thermally-assisted magnetic recording head 1 according to the present embodiment is provided with a slider 10 and a light source unit 50. The slider 10 is formed of ALTIC ($Al_2O_3$—TiC) or the like and is provided with a slider substrate 11 having an air bearing surface (ABS) 11a and a head part 12. The ABS 11a as a medium opposing surface is processed to obtain an appropriate flying height, and the head part 12 is formed on an element formation surface 11b perpendicular to the ABS 11a.

Furthermore, the light source unit 50 is formed of ALTIC ($Al_2O_3$—TiC) or the like, and is provided with a unit substrate 51 having a joining surface 51a, and a laser diode 60 as a light source, the laser diode 60 being provided on a light source installation surface 51b perpendicular to the joining surface 51a.

Here, the slider 10 and the light source unit 50 are joined with each other such that a back surface 11c of the slider substrate 11 contacts the joining surface 51a of the unit substrate 51. The back surface 11c of the slider substrate 11 means an end surface of the slider substrate 11 on the opposite side to the ABS 11a. Note, the thermally-assisted magnetic recording head 1 according to the present embodiment may have a configuration in which the laser diode 60 is directly mounted on the slider 10 without using the light source unit 50.

The head part 12 formed on the element formation surface 11b of the slider substrate 11 is provided with a head element 20, a waveguide 23, a plasmon generator 24, a protective layer 31, a pair of first terminal electrodes 25a, and a pair of second terminal electrodes 25b. The head element 20 has an MR element 21 for reading out data from the magnetic disk 301 and an electromagnetic transducer element 22 for writing data to the magnetic disk 301. The waveguide 23 is disposed for guiding laser light from the laser diode 60 provided on the light source unit 50 to an ABS side. The plasmon generator 24 configures a near-field light generating optical system with the waveguide 23. The protective layer 31 is formed on the element formation surface 11b so as to cover the MR element 21, the electromagnetic transducer element 22, the waveguide 23, and the plasmon generator 24. The pair of first terminal electrodes 25a is exposed on an upper surface of the protective layer 31 and is electrically connected to the MR element 21. The pair of second terminal electrodes 25b is exposed on the upper surface of the protective layer 31 and is electrically connected to the electromagnetic transducer element 22. The first and second terminal electrodes 25a and 25b are electrically connected to the connection pad of the wiring member 324 provided to the flexure 322 (see FIG. 2).

One end of the MR element 21, one end of the electromagnetic transducer element 22, and one end of the plasmon generator 24 respectively reach a head part end surface 12a, which is the air bearing surface of the head part 12. Here, the head part end surface 12a and the ABS 11a form the medium opposing surface (or air bearing surface) of the entire thermally-assisted magnetic recording head 1 according to the present embodiment.

During the actual writing and reading, the thermally-assisted magnetic recording head 1 hydro-dynamically flies above the surface of the rotating magnetic disk 301 at a predetermined flying height. At this time, the end surfaces of the MR element 21 and the electromagnetic transducer element 22 oppose the surface of the magnetic recording layer of the magnetic disk 301 maintaining an appropriate magnetic spacing therebetween. In this state, the MR element 21 performs the reading by sensing a data signal magnetic field from the magnetic recording layer, and the electromagnetic transducer element 22 performs the writing by applying a data signal magnetic field to the magnetic recording layer.

At the time of the writing, the laser light that has propagated from the laser diode 60 of the light source unit 50 through the waveguide 23 is coupled with the plasmon generator 24 in a surface plasmon mode and excites surface plasmon at the plasmon generator 24. This surface plasmon propagates through a projection part 241 (see FIG. 4), which will be described later, of the plasmon generator 24 toward the head part end surface 12a so that near-field light is generated at an end part of the plasmon generator 24 on a head part end surface 12a side. This near-field light reaches the surface of the magnetic disk 301 and heats a portion of the magnetic recording layer of the magnetic disk 301. As a result, anisotropy field (coercive force) at that portion decreases to a value at which the writing becomes possible. It becomes able to perform the thermally-assisted magnetic recording by applying a writing magnetic field to the portion where the anisotropy field has decreased.

Figure 4:
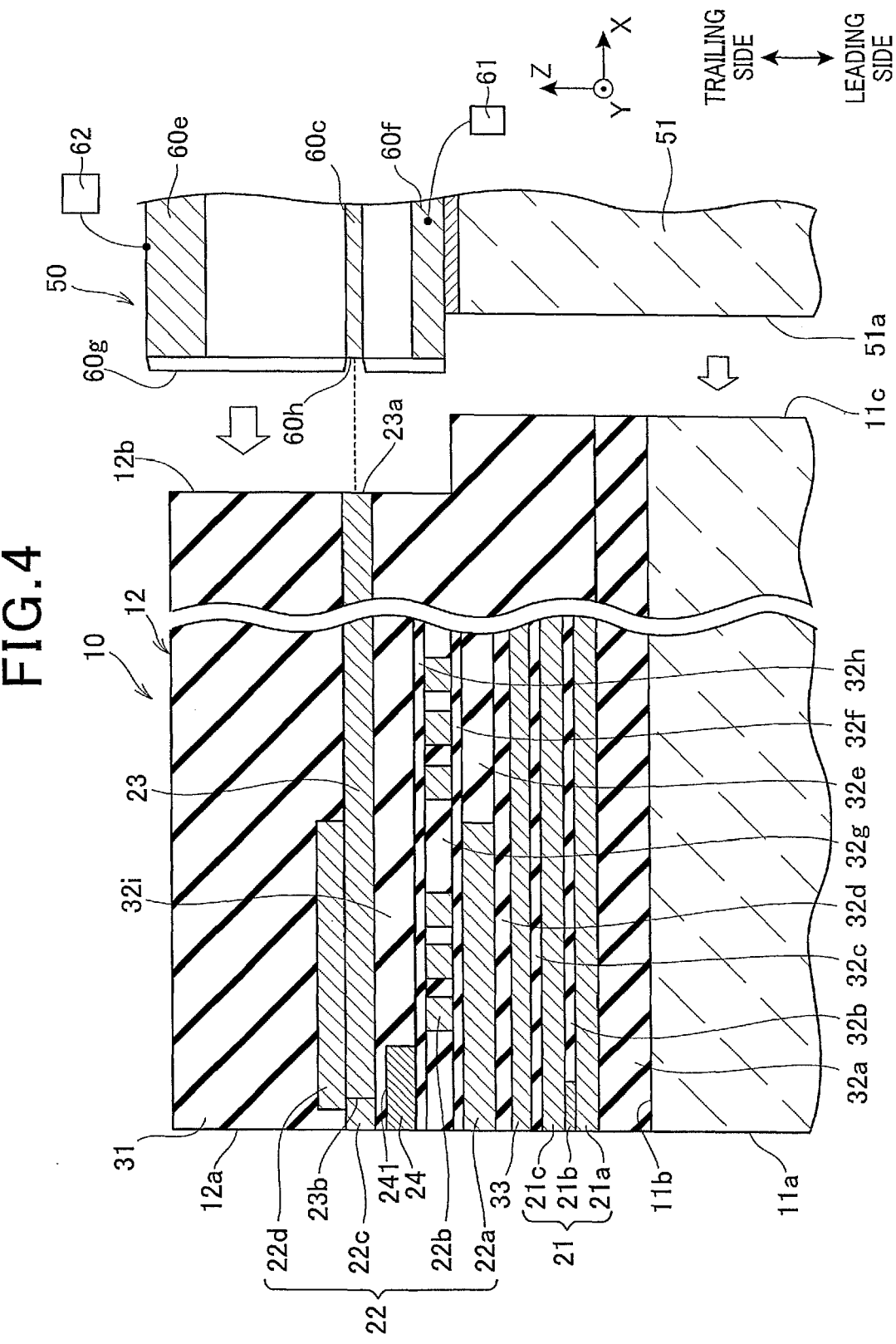
FIG. 4 is a cross-sectional view (XZ plane) cut along A-A line in FIG. 3, and schematically illustrates a configuration of a main part of the thermally-assisted magnetic recording head according to the embodiment of the present invention.

FIG. 4 is a cross-sectional view of the A-A line (XZ plane) in FIG. 3, and schematically illustrates a configuration of the thermally-assisted magnetic recording head 1 according to the present embodiment.

As illustrated in FIG. 4, the MR element 21 has a lower shield layer 21a formed on a first insulating layer 32a on the element formation surface 11b of the slider substrate 11, an MR multilayer body 21b formed on the lower shield layer 21a, and an upper shield layer 21c formed on the MR multilayer body 21b. A second insulating layer 32b is provided between the lower shield layer 21a and the upper shield layer 21c in the periphery of the MR multilayer body 21b. The lower shield layer 21a and the upper shield layer 21c prevent the MR multilayer body 21b from receiving the effects of external magnetic fields which are noise.

The lower shield layer 21a and the upper shield layer 21c are magnetic layers with a thickness of approximately 0.5-3 μm formed by, for example, a frame plating method, a spattering method, or the like of a soft magnetic material such as, for example, NiFe (permalloy), FeSiAl (sendust), CoFeNi, CoFe, FeN, FeZrN, CoZrTaCr, etc., a multilayer film formed of these materials, or the like.

The MR multilayer body 21b is a magnetically sensitive part that senses a signal magnetic field using the MR effect and may be any one of a current in plane-giant magnetoresistive (CIP-GMR) multilayer body that uses a current in plane-giant magnetoresistive effect, a current perpendicular to plane-giant magnetoresistive (CPP-GMR) multilayer body that uses a current perpendicular to plane-giant magnetoresistive effect, and a tunnel-magnetoresistive (TMR) multilayer body that uses a tunnel-magnetoresistive effect. When the MR multilayer body 21b is a CPP-GMR multilayer body or a TMR multilayer body, the lower shield layer 21a and the upper shield layer 21c also function as electrodes. On the other hand, when the MR multilayer body 21b is a CIP-GMR multilayer body, insulating layers are provided respectively between the MR multilayer body 21b and the lower shield layer 21a and between the MR multilayer body 21b and the upper shield layer 21c. Moreover, an MR lead layer that is electrically connected to the MR multilayer body 21b is provided.

When the MR multilayer body 21b is a TMR multilayer body, the MR multilayer body 21b has a structure in which the following are sequentially laminated: an antiferromagnetic layer formed of, for example, IrMn, PtMn, NiMn, RuRhMn, or the like having a thickness of approximately 5-15 nm; a magnetization pinned layer that has a structure in which two ferromagnetic layers formed of, for example, CoFe or the like sandwich a nonmagnetic metal layer formed of Ru or the like and that has a magnetization direction pinned by the antiferromagnetic layer; a tunnel barrier layer formed of a nonmagnetic dielectric material that is a metal film formed of Al, AlCu, or the like having a thickness of approximately 0.5-1 nm oxidized by oxygen introduced into a vacuum device or by natural oxidation; and a magnetization free layer that is configured with a double layer film formed of a layer of CoFe or the like, which is a ferromagnetic material, having a thickness of approximately 1 nm and a layer of NiFe or the like, which is a ferromagnetic material, having a thickness of approximately 3-4 nm and that achieves tunnel exchange coupling with the magnetization pinned layer through the tunnel barrier layer therebetween.

The head part 12 in the present embodiment is provided with a third insulating layer 32c provided on the upper shield layer 21c, an interelement shield layer 33 provided on the third insulating layer 32c, and a fourth insulating layer 32d provided on the interelement shield layer 33. The interelement shield layer 33 may be formed of a soft magnetic material, and has a function of shielding the MR element 21 from the magnetic field generated at the electromagnetic transducer element 22 provided on the fourth insulating layer 32d. Note, the third insulating layer 32c and the interelement shield layer 33 may be omitted.

The electromagnetic transducer element 22 for the perpendicular magnetic recording is provided with a lower yoke layer 22a provided on the fourth insulating layer 32d, a writing coil 22b provided on the lower yoke layer 22a, a pole 22c that is provided above the writing coil 22b and that reaches the head part end surface 12a so as to form a part of the head part end surface 12a, an upper yoke layer 22d provided above the pole 22c, two linkage parts 22e and 22e (see FIG. 7) that are provided on the lower yoke layer 22a so as to sandwich the waveguide 23, which will be described later, from both sides in the Y axis direction (track width direction) and to link the lower yoke layer 22a and the upper yoke layer 22d. The writing coil 22b has a spiral structure in which the writing coil 22b wounds around two linkage layers 22e and 22e (see FIG. 7) so as to at least go across between the lower yoke layer 22a and the upper yoke layer 22d during one turn.

The head part 12 in the present embodiment is provided with a fifth insulating layer 32e provided on the fourth insulating layer 32d in the vicinity of the lower yoke layer 22a, a sixth insulating layer 32f provided on the lower yoke layer 22a and the fifth insulating layer 32e, a seventh insulating layer 32g provided between the winding lines of the writing coil 22b and in its vicinity, an eighth insulating layer 32h provided on the writing coil 22b and the seventh insulating layer 32g, and a ninth insulating layer 32i provided on the eighth insulating layer 32h in the vicinity of the plasmon generator 24, which will be described later.

In the head part 12 in the present embodiment, the lower yoke layer 22a, the linkage layers 22e, the upper yoke layer 22d, and the pole 22c form a magnetic guide path that allows a magnetic flux corresponding to a magnetic field generated by the writing coil 22b to pass through and that guides the magnetic flux to the magnetic recording layer (perpendicular magnetization layer) of the magnetic disk 301. The furthest leading side of the end surface 220 of the pole 22c that forms a part of the head part end surface 12a is the point that generates a writing magnetic field.

The pole 22c is preferably formed of a soft magnetic material having a higher saturation magnetic flux density than that of the upper yoke layer 22d, and is formed of a soft magnetic material such as, for example, FeNi, FeCo, FeCoNi, FeN, FeZrN, or the like, which are iron-based alloy materials having Fe as a primary component. Note, the thickness of the pole 22c in the Z axis direction may be set to be 0.1-0.8 μm.

Furthermore, the width of the pole 22c in the Y axis direction is preferably 0.2-0.3 μm. When the width of the pole 22c in the Y axis direction is within the above-described range, a magnetic field having a writable intensity can be appropriately applied to the heating spot of the magnetic disk 301 that is heated by the plasmon generator 24. Furthermore, the thickness of the pole 22c in the X axis direction (height direction) is preferably thin to the extent possible and is preferably 0.06-0.3 μm. When the thickness of the pole 22c is thinned, this enables the distance MO (see FIG. 5) to be shortened (10-40 nm) and, in parallel, enables the spot diameter of near-field light irradiated to the magnetic disk 301 to be small. The distance MO is the distance on the head part end surface 12a between the pole 22c and the projection part 241 (upper surface of the projection part) of the plasmon generator 24. Therefore, the demands for high SN ratio and high recording density can be satisfied together.

The end surface of the upper yoke layer 22d on the head part end surface 12a side does not reach the head part end surface 12a, and is provided at a recessed position at a predetermined distance from the head part end surface 12a toward the head part back end surface 12b side in the X axis direction. Thereby, magnetic flux can be focused at the pole 22c, and the intensity of a magnetic field generated from the pole 22c can be strengthened.

The writing coil 22b is formed of a conductive material such as Cu (copper) or the like. Note, the writing coil 22d is a single layer in the present embodiment; however, may be two or more layers or may be a helical coil arranged so as to sandwich the upper yoke layer 22d. Furthermore, the winding number of the writing coil 22b is not particularly limited, and can be set to 2-7 turns, for example.

The lower yoke layer 22a is formed on the forth insulating layer 32d formed of an insulation material such as Al$_2$O$_3$ (alumina), and functions as a magnetic guide path that guides a magnetic flux that has returned from a soft magnetic under layer provided under the magnetic recording layer (perpendicular magnetization layer) of the magnetic disk 301. The lower yoke layer 22a is formed of a soft magnetic material and has a thickness of approximately 0.5-5 μm, for example.

The waveguide 23 is provided at a recessed position from the pole 22c in the X axis direction (height direction) from the perspective of the ABS 11a (the head part end surface 12a). The plasmon generator 24 is provided below the pole 22c (on the leading side). The waveguide 23 and the plasmon generator 24 form an optical system for generating near-field light in the head part 12.

The waveguide 23 is elongated in parallel with the element formation surface 11b from a rear end surface 23a that forms a part of a head part rear end surface 12b toward a rear end surface of the pole 22c, and a predetermined gap is between the rear end surface of the pole 22c and an end surface 23b so that the waveguide 23 does not contact the pole 22c. Also, a lower surface (a part of side surfaces) of the waveguide 23 and a part of the projection part 241 of the plasmon generator 24 oppose each other with a predetermined gap therebetween, and the portion sandwiched by these is a buffer portion 40 with a lower refractive index than the refractive index of the waveguide 23.

The buffer portion 40 functions to couple laser light propagating through the waveguide 23 with the plasmon generator 24 in the surface plasmon mode. Note, the buffer portion 40 may be a part of the ninth insulating layer 32i or may be another layer provided separately from the ninth insulating layer 32i.

The plasmon generator 24 is provided such that the projection part 241 opposes both the pole 22c and the waveguide 23. Note, the specific configurations of the pole 22c, the waveguide 23, and the plasmon generator 24 are described later.

As illustrated in FIG. 4, the light source unit 50 is provided with the unit substrate 51, the laser diode 60 provided on the light source installation surface 51b of the unit substrate 51, a first drive terminal electrode 61 electrically connected to an electrode 60f that forms a lower surface of the laser diode 60, and a second drive terminal electrode 62 electrically connected to an electrode 60e that forms an upper surface of the laser diode 60. The first and second drive terminal electrodes 61 and 62 are electrically connected to the connection pad of the wiring member 324 provided on the flexure 322 (see FIG. 2). When a predetermined voltage is applied to the laser diode 60 from the first and second drive terminal electrodes 61 and 62, laser light is radiated from an emission center 60h positioned on an emission surface of the laser diode 60. Here, in the head structure illustrated in FIG. 4, an oscillation direction of an electric field of laser light that the laser diode 60 generates is preferably perpendicular to a lamination layer surface of an active layer 60d (in the Z axis direction). That is, it is preferable that laser light that the laser diode 60 generates is a TM-mode polarized light. As a result, laser light propagating through the waveguide 23 becomes able to be properly coupled with the plasmon generator 24 in the surface plasmon mode through the buffer portion 40.

As the laser diode 60, it is possible to use a diode that is generally used for communication, optical disk storage, material analysis or the like such as InP-type, GaAs-type, and GaN-type diodes etc. The wavelength $\lambda_L$ of laser light to radiate need only be in the range of 375 nm-1.7 μm, for example.

Specifically, it is also possible to use an InGaAsP/InP quaternary mixed crystal type laser diode, of which the available wavelength region is set to be 1.2-1.67 μm, for example. The laser diode 60 has a multilayered structure that includes an upper electrode 60e, the active layer 60c, and a lower electrode 60f. Reflection layers for exciting oscillation by total reflection are formed on the front and back of cleavage surfaces of this multilayered structure. In a reflection layer 60g, an aperture is provided at a position of the active layer 60c that includes the emission center 60h. It is possible to set the thickness $T_{LA}$ of the laser diode 60 to be approximately 60-200 μm, for example.

Also, it is possible to use a power source in the magnetic disk device for driving the laser diode 60. In actual, magnetic disk devices normally is provided with a power source of approximately 5V, for example, and therefore a sufficient voltage for a laser oscillation operation is maintained. In addition, power consumption of the laser diode 60 is approximately several tens of mW, for example, and therefore the power source in the magnetic disk device can sufficiently cover the power. In actual, the power source applies a predetermined voltage to the middle of the first drive terminal electrode 61 that is electrically connected to the lower electrode 60f and the second drive terminal electrode 62 that is electrically connected to the upper electrode 60e to oscillate the laser diode 60, and thereby the laser light is radiated from the aperture including the emission center 60h in the reflection layer 60g. Note, the laser diode 60 and the first and second drive terminal electrodes 61 and 62 are not limited to the above-described embodiment. For example, the electrodes may be positioned in a vertically reversed manner in the laser diode 60, and the upper electrode 60e may be joined to the light source installation surface 51b of the unit substrate 51. Also, it is possible to optically connect the laser diode and the waveguide 23 with each other by installing the laser diode on the element formation surface 11b of the thermally-assisted magnetic recording head 1. Moreover, it is possible for thermally-assisted magnetic recording head 1 to be provided without the laser diode 60 and to have the emission center of a laser diode provided in the magnetic disk device and the rear end surface 23a of the waveguide 23 that are connected with each other by an optical fiber or the like, for example.

The sizes of the slider 10 and the light source unit 50 are arbitrary; however, for example, the slider 10 may be also a so-called femto slider having a width of 700 μm in the track width direction (Y axis direction), a length of 850 μm (in Z axis direction), and a thickness of 230 μm (in X axis direction). In this case, the size of the light source unit 50 may be smaller than the size of the slider and may have a width of 425 μm in the track width direction, a length of 300 μm, and a thickness of 300 μm, for example.

By connecting the above-described light source unit 50 and slider 10, the thermally-assisted magnetic recording head 1 is configured. In this connection, the joining surface 51a of the unit substrate 51 and the back surface 11c of the slider substrate 11 contacte each other. At this time, the position of the unit substrate 51 and the position of the slider substrate 11 are determined such that the laser light generated from the laser diode 60 enters into the rear end surface 23a of the waveguide 23 that is on the side opposite to the ABS 11a.

Figure 5:
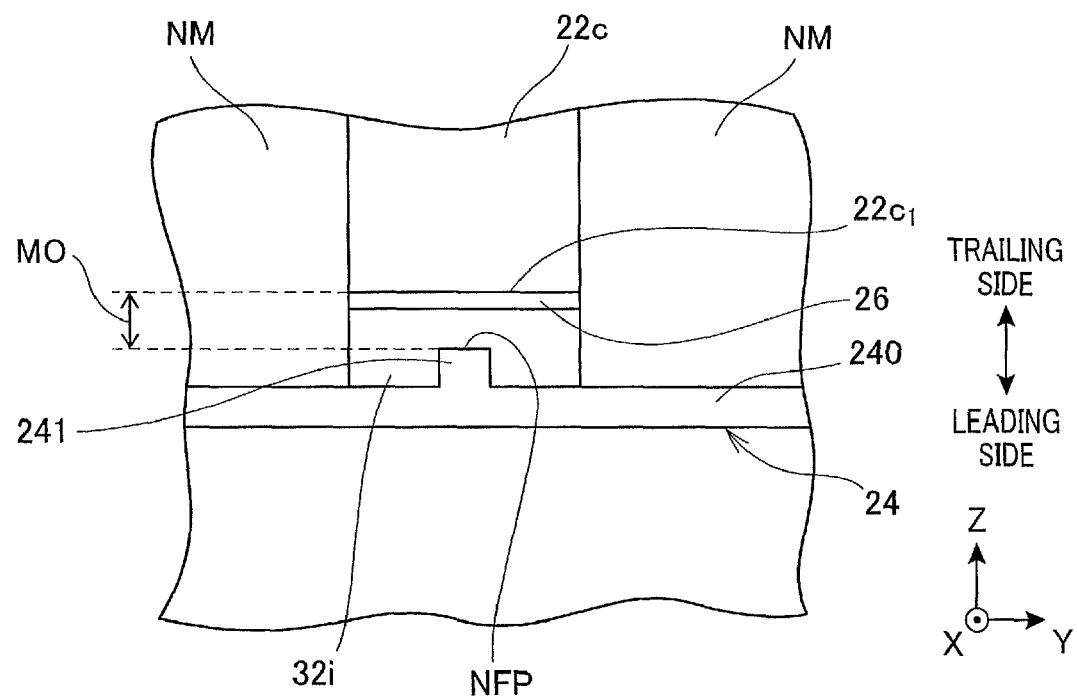
FIG. 5 is a plan view from the perspective of an air bearing surface side, the view mainly schematically illustrating a configuration of a waveguide, a plasmon generator, and a pole in the thermally-assisted magnetic recording head according to the embodiment of the present invention.
Figure 6:
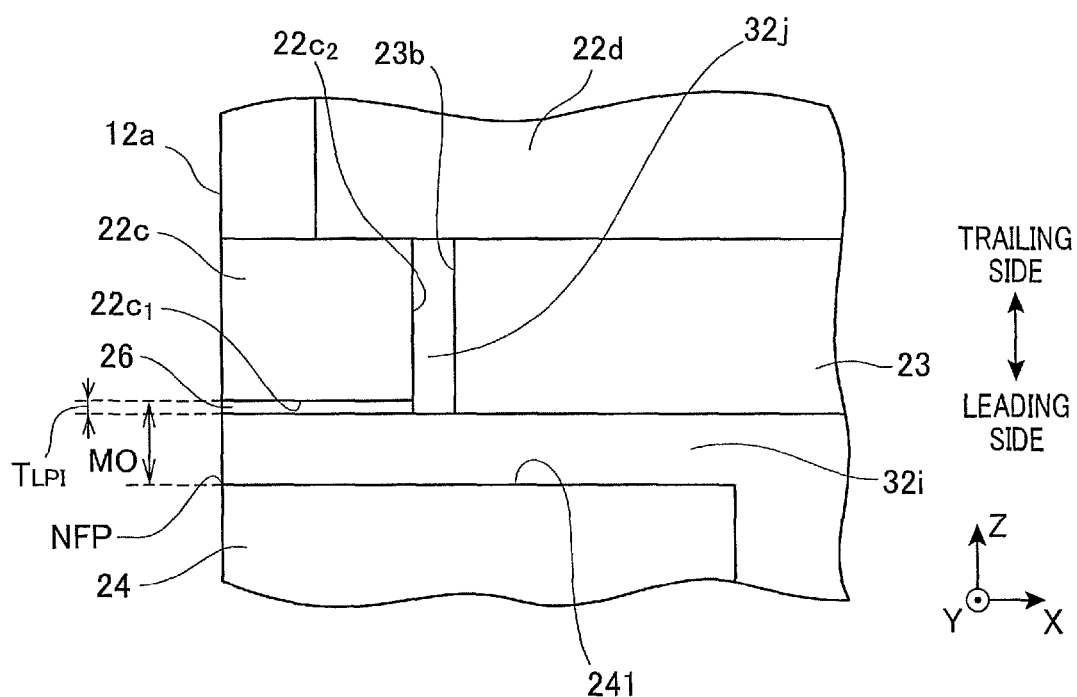
FIG. 6 is an enlarged cross-sectional view (XZ plane) mainly schematically illustrating a configuration of the waveguide, the plasmon generator, and the pole in the thermally-assisted magnetic recording head according to the embodiment of the present invention.

FIG. 5 is a plan view from the perspective of the air bearing surface side, the view mainly schematically illustrating a configuration of the waveguide 23, the plasmon generator 24, and the pole 22c in the thermally-assisted magnetic recording head 1 according to the present embodiment. FIG. 6 is a partially-enlarged-cross-sectional view (partially-enlarged view of the cross-section (XZ plane) of FIG. 4) mainly schematically illustrating a configuration of the waveguide 23, the plasmon generator 24, and the pole 22c in the thermally-assisted magnetic recording head 1 according to the present embodiment.

As illustrated in FIG. 5, the thermally-assisted magnetic recording head 1 according to the present embodiment has nonmagnetic metal parts NM and NM respectively contacting both side surfaces of the pole 22c in the Y axis direction (track width direction) from the perspective of the head part end surface 12a side. The contacting of the nonmagnetic metal parts NM and NM with the pole 22c allows the nonmagnetic metal parts NM and NM to function as heatsinks, and thereby an excessive temperature increase in the pole 22c can be suppressed. Furthermore, the provision of the nonmagnetic metal parts NM and NM on the both sides of the pole 22c in the Y axis direction (track width direction) from the perspective of the head part end surface 12a side enables to suppress diffusion of near-field light toward the Y axis direction (track width direction), the near-field light being generated from the projection part 241 of the plasmon generator 24, and to further reduce the spot diameter of the near-field light irradiated to the magnetic disk 301.

The nonmagnetic metal part NM and NM may be provided in a non-contacting manner with a plane part 240 of the plasmon generator 24; however, are preferably provided in a contacting manner with the plane part 240. The contacting of the nonmagnetic metal parts NM and NM with the plane part 240 of the plasmon generator 24 can also suppress an excessive temperature increase in the plasmon generator 24.

Given as a material for configuring the nonmagnetic metal part NM is, for example, Au, Cu, Ag, Al, Pt, W, or Ru, or an alloy made of at least one type of these, etc.

Lengths of the nonmagnetic metal part NM in the X axis direction (height direction), in the Y axis direction (track width direction), and in the Z axis direction are, as long as the excessive temperature increase in the pole 22c can be suppressed and moreover as long as diffusion toward the Y axis direction (track width direction) of near-field light generated from the projection part 241 of the plasmon generator 24 can be suppressed, not particularly limited and may be arbitrarily set. For example, length of the nonmagnetic metal part NM in the X axis direction (height direction) may be set to be 100-3,000 nm; length in the Y axis direction (track width direction) may be set to be 200-10,000 nm; length in the Z axis direction may be set to be 100-1,000 nm.

As illustrated in FIG. 6, in the thermally-assisted magnetic recording head 1 according to the present embodiment, the pole 22c has a projection part opposing surface $22c_1$ that opposes the projection part 241 (upper surface of the projection part), the ninth insulating layer 32i is intervened between the pole 22c and the projection part 241 (upper surface of the projection part) of the plasmon generator 24, and a light penetration suppression part 26 is provided on the projection part opposing surface $22c_1$. By the light penetration suppression part 26 provided, even when light (electromagnetic field) propagating through the projection part 241 of the plasmon generator 24 attempts to go into the light penetration suppression part 26 toward the pole 22c, the light cannot go into the light penetration suppression part 26 due to high skin effect of the light penetration suppression part 26. As a result, light peak intensity of near-field light irradiated to the magnetic disk 301 can be increased.

The light penetration suppression part 26 is preferably configured of a metal material whose attenuation coefficient is larger than that of a metal material configuring the plasmon generator 24. When the light penetration suppression part 26 is configured of a metal material whose attenuation coefficient is larger than that of a metal material (for example, Au (attenuation coefficient to light with wavelength of 800 nm; k=4.9), Ag (attenuation coefficient to light with wavelength of 800 nm; k=5.2), or the like) configuring the plasmon generator 24, penetration of light (electromagnetic field) into the light penetration suppression part 26, the light propagating through the projection part 241, is suppressed. Examples of such metal materials are Al (attenuation coefficient to light with wavelength of 800 nm; k=8.1), Mg (attenuation coefficient to light with wavelength of 800 nm; k=8.0), In (attenuation coefficient to light with wavelength of 800 nm; k=6.6), and Sn (attenuation coefficient to light with wavelength of 800 nm; k=7.3), and an alloy made of at least one type of above-mentioned metals.

Thickness $T_{LPI}$ (thickness in the Z axis direction) of the light penetration suppression part 26 is preferably 0.5-6.25 nm, and more preferably 1.25-5.5 nm. When the thickness is less than 0.5 nm, light penetration suppression effect by the light penetration suppression part 26 may not be sufficient; when the thickness is in excess of 6.25 nm, increase of the light penetration suppression effect is rarely observed, and thereby the distance between the pole 22c and the projection part 241 is increased, which is not preferred.

A distance MO, which is on the head part end surface 12a between the pole 22c and the projection part 241 (upper surface of the projection part) of the plasmon generator 24, is 10-40 nm, and preferably 15-30 nm. When the distance MO is less than 10 nm, near-field light may be absorbed by the pole 22c and reflect off the pole 22c, so that a near-field light peak intensity sufficient to heat the magnetic disk 301 may not be obtained. When the distance MO is in excess of 40 nm, the distance between the center of a magnetic field applied to the magnetic disk 301 and the center of near-field light irradiated is increased, so that the demand for high SN ratio becomes unable be satisfied. In other words, when the distance MO is in the above-described range, near-field light, which is generated from a near-field light generating portion NFP (see FIGS. 5-7) of the plasmon generator 24 and which diffuses toward the magnetic pole 22c side, is suppressed by the existence of the pole 22c. Therefore a spot diameter of light irradiated to the magnetic disk 301 can be reduced and, in parallel, demands for high recording density and high SN ratio can be satisfied.

The waveguide 23 is provided in the back side of the pole 22c along the direction perpendicular to the head part end surface 12a so as to be hidden by the pole 22c from the perspective of the head part end surface 12a side. The provision of the waveguide 23 in such position enables to set the distance MO, which is on the head part end surface 12 between the pole 22c and the projection part 241 (upper surface of the projection part) of the plasmon generator 24, within the above-described range, and also to set the distance between the waveguide 23 and the projection part 241 (upper surface of the projection) opposing the waveguide 23 at such a degree that makes possible for laser light propagating through the waveguide 23 to couple to the projection part 241 of the plasmon generator 24 in the surface plasmon mode.

Figure 7:
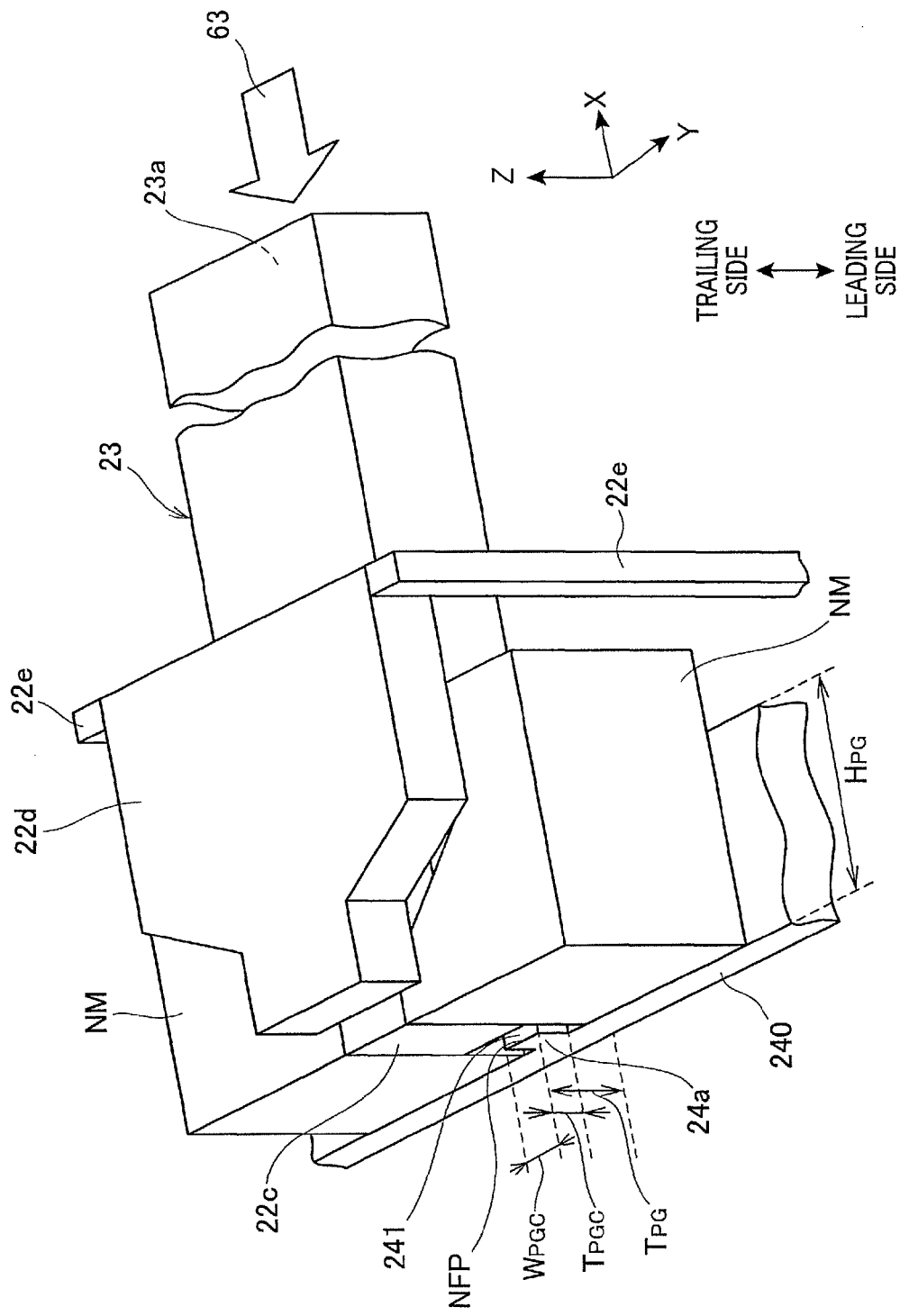
FIG. 7 is a perspective view schematically illustrating a configuration of the waveguide, the plasmon generator, and the pole in the thermally-assisted magnetic recording head according to the embodiment of the present invention.

FIG. 7 is a perspective view schematically illustrating a configuration of the waveguide 23, the plasmon generator 24, and the pole 22c in the thermally-assisted magnetic recording head 1 according to the present embodiment. In FIG. 7, the head part end surface 12a including a portion from which a writing magnetic field and near-field light are radiated to the magnetic recording medium is positioned on the left side.

As illustrated in FIG. 7, the thermally-assisted magnetic recording head 1 according to the present embodiment is provided with the waveguide 23 for propagating laser light 63 for generating near-field light, and the plasmon generator 24 that includes the projection part 241 through which the surface plasmon excited by the laser light (waveguide light) 63 propagates. The projection part 241 opposes the lower surface of the waveguide 23 with a predetermined gap therebetween.

The plasmon generator 24 is provided with a near-field light generating end surface 24a that reaches the head part end surface 12a. Additionally, the portion that is sandwiched by a portion of an side surface of the waveguide 23 and a portion of an upper surface (side surface) of the plasmon generator 24 including the projection part 241 forms a buffer portion 40 (see FIG. 4). In other words, a portion of the projection part 241 is covered by the buffer portion 40. The buffer portion 40 functions to couple the laser light (waveguide light) 63 with the plasmon generator 24 in the surface plasmon mode. Additionally, the projection part 241 functions to propagate the surface plasmon excited by the laser light (waveguide light) 63 to the near-field light generating end surface 24a.

Note, side surfaces of the waveguide 23 refer end surfaces out of end surfaces surrounding the waveguide 23, excluding the end surface 23b (see FIG. 6) positioned on the head part end surface 12a side and the rear end surface 23a opposite to the end surface 23b. The side surfaces of the waveguide 23 are the surfaces on which the laser light (waveguide light) 63 may totally reflect, the light propagating through the waveguide 23, and herein the waveguide 23 corresponds to a core. In the present embodiment, the side surface of the waveguide 23 having a portion contacting the buffer portion 40 is a lower surface of the waveguide 23.

More specifically, the laser light (waveguide light) 63 that has propagated to the vicinity of the buffer portion 40 is coupled with the optical configuration of the waveguide 23 having a predetermined refractive index $n_{WG}$, the buffer portion 40 having a predetermined refractive index $n_{BF}$, and the plasmon generator 24 made of a conductive material such as a metal or the like, and thereby the surface plasmon mode at the projection part 241 of the plasmon generator 24 is induced. In other words, the laser light (waveguide light) 63 is coupled with the plasmon generator 24 in the surface plasmon mode. It becomes possible to achieve this induction of the surface plasmon mode when the refractive index $n_{BF}$ of the buffer portion 40 is set to be smaller than the refractive index $n_{WG}$ of the waveguide 23 ($n_{BF}<n_{WG}$). Actually, evanescent light is excited in the buffer portion 40 based on the optical interfacial condition between the waveguide 23, which is the core, and the buffer portion 40. Then, the surface plasmon mode is induced such that the evanescent light and a fluctuation of charges excited on the surface (projection part 241) of the plasmon generator 24 are coupled with each other, and surface plasmon 70 is excited (see FIG. 9). Herein, the projection part 241 is in the closest position to the waveguide 23 and also the width in the Y axis direction is extremely small, so that an electrical field is more likely to be concentrated. Accordingly, the surface plasmon 70 is more likely to be excited.

A gap G (see FIG. 9) between the lower surface of the waveguide 23 (surface opposite to the plasmon generator 24) and the upper surface of the projection part 241 of the plasmon generator 24 (surface opposite to the waveguide 23) is preferably 15-40 nm, and further preferably 25-30 nm. When the gap G is within the above-described range, it is possible to increase light density and to decrease the light spot diameter of near-field light irradiated to the magnetic disk 301.

As illustrated in FIG. 7, the plasmon generator 24 has a plane part 240 and the projection part 241 that is projected from the plane part 240 to the waveguide 23 side, and an end surface that forms a part of the head part end surface 12a is the near-field light generating end surface 24a.

A portion of the projection part 241 opposes the waveguide 23 with the buffer portion 40 therebetween, and is elongated to the near-field light generating end surface 24a. Thereby, the projection part 241 can realize the function of propagating the surface plasmon excited by the laser light (waveguide light) that has propagated through the waveguide 23. In other words, the plasmon generator 24 couples to the waveguide light in the surface plasmon mode so as to propagate the surface plasmon on the projection part 241. As a result, near-field light is generated from the near-field light generating portion NFP on the near-field light generating end surface 24a.

The projection height $T_{PGC}$ of the projection part 241 is preferably 15-45 nm. Also, the width $W_{PGC}$ of the near-field light generating end surface 24a of the projection part 241 in the Y axis direction is smaller than the wavelength of the laser light (waveguide light) 63, and is preferably 15-30 nm. Also, from the perspective of the air bearing surface side where the waveguide 23 is positioned on the trailing side with respect to the plasmon generator 24, the height $T_{PG}$ from a lower end of the plane part 240 to the upper end (upper surface) of the projection part 241 is preferably 65-205 nm, and further preferably approximately 130 nm. Furthermore, the length $H_{PG}$ of the plasmon generator 24 in the X axis direction is preferably 1.0-1.4 μm, and further preferably approximately 1.2 μm. When the plasmon generator 24 and the projection part 241 have the above-described size, it is possible to decrease the light spot diameter of near-field light irradiated to the magnetic disk 301.

Figure 8A:
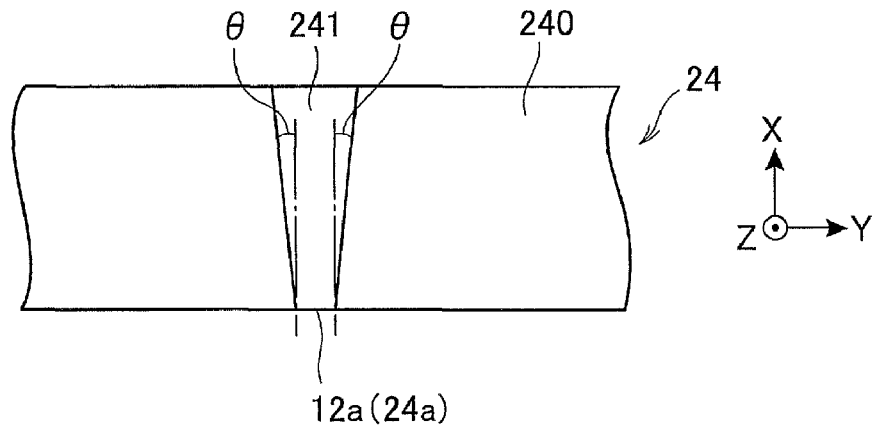
FIGS. 8A-8C are plan views schematically illustrating the shapes of projection parts of the plasmon generators according to the embodiment of the present invention.
Figure 8B:
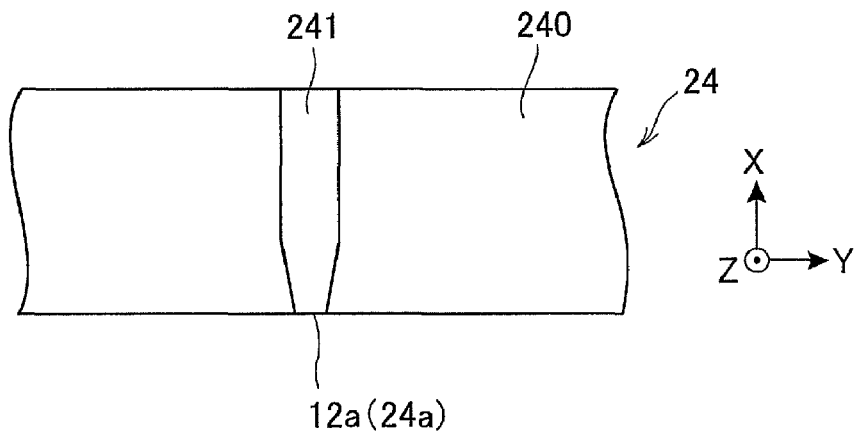
Figure 8C:
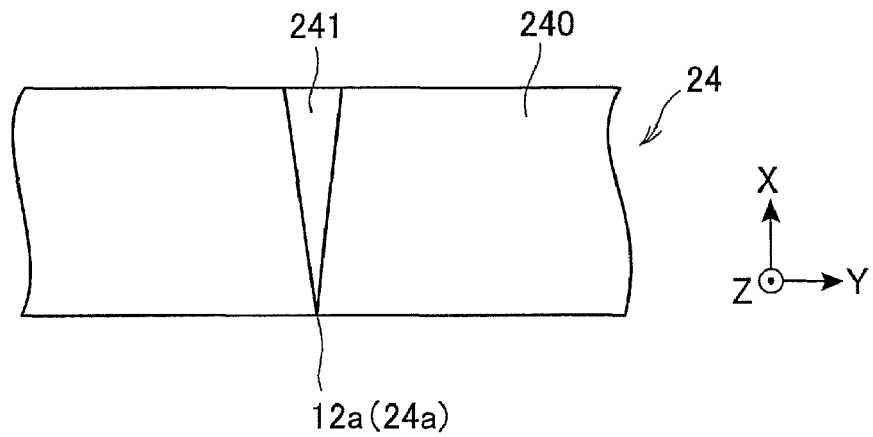

In the present embodiment, the shape of the upper surface of the projection part 241 is a rectangle; however, is not limited to this shape. For example, as illustrated in FIG. 8A, the shape of the upper surface of the projection part 241 may be a trapezoidal shape that is formed by a short side positioned on the head part end surface 12a, a long side positioned on the head part rear end surface 12b side, and two inclined sides that respectively connect end parts of the sides. Therein, the width in the Y axis direction gradually gets wider as approaching from the head part end surface 12a toward the head part rear end surface 12b side. Also, as illustrated in FIG. 8B, the shape of the upper surface of the projection part 241 may be the shape where the width in the Y axis direction gradually gets wider as approaching from the head part end surface 12a toward the back side in the X axis direction to a predetermined position and gets constant from the predetermined position to the head part rear end surface 12b side. Furthermore, as illustrated in FIG. 8C, the shape of the upper surface of the projection part 241 may be also a substantially triangular shape where its apex is positioned on the head part end surface 12a and the width in the Y axis direction gradually gets wider as approaching toward the head part rear end surface 12b side. When the shape of the upper surface of the projection part 241 is any one of the above-described shapes, it is possible to increase the light density of near-field light irradiated to the magnetic disk 301 and to reduce the light spot diameter. As illustrated in FIG. 8A, the angles θ formed respectively by the two inclined sides of the trapezoid in the upper surface of the projection part 241 and the X axis are preferably less than 10 degree, further preferably 1-3 degree, and extremely preferably approximately 2 degree.

The plane part 240 of the plasmon generator 24 can function to release heat generated at the near-field light generating portion NFP on the near-field light generating end surface 24a of the plasmon generator 24 from the near-field light generating portion NFP. As a result, this can contribute to suppress the excessive temperature increase in the plasmon generator 24 and to prevent an unnecessary projection of the near-field light generating end surface 24a and a significant reduction in light usage efficiency of the plasmon generator 24.

The plasmon generator 24 is preferably formed of a conductive material such as a metal (e.g., Pd (attenuation coefficient to light with wavelength of 800 nm; k=5.1); Pt (attenuation coefficient to light with wavelength of 800 nm; k=5.0), Rh (attenuation coefficient to light with wavelength of 800 nm; k=6.8), Ir (attenuation coefficient to light with wavelength of 800 nm; k=5.3), Ru (attenuation coefficient to light with wavelength of 800 nm; k=5.2), Au (attenuation coefficient to light with wavelength of 800 nm; k=4.9), Ag (attenuation coefficient to light with wavelength of 800 nm; k=5.2), or Cu (attenuation coefficient to light with wavelength of 800 nm; k=5.1)), or an alloy formed of at least two types selected from these metals, and is further preferably formed of a material whose attenuation coefficient is smaller than that of a metal material configuring the light penetration suppression part 26.

The waveguide 23 is provided in a position recessed more than the pole 22c in the X axis direction (height direction) with a predetermined gap from the rear end surface $22c_2$ (see FIG. 6) of the pole 22c. Then, between the rear end surface $22c_2$ of the pole 22c and the end surface 23b (see FIG. 6) of the waveguide 23, the insulating layer 32j (see FIG. 6) is provided. With such configuration, the waveguide 23 and the pole 22c can be positionally separated from each other. As a result, a case can be avoided, in which a portion of the laser light (waveguide light) 63 is absorbed by the pole 22c formed of a metal so that the amount of light to be transduced to the near-field light decreases.

Regarding the shape of the waveguide 23, the width in the track width direction (Y axis direction) may be constant; however, as illustrated in FIG. 5 and FIG. 7, the width may guradually get wider as approaching from the end surface 23b of the waveguide 23 toward the back side in the X axis direction (height direction). The width in the track width direction (Y axis direction) of the rear end surface 23a of the waveguide 23 may be, for example, approximately 0.5-20 μm; the width in the track width direction (Y axis direction) of the end surface 23b may be, for example, approximately 0.3-10 μm; the thickness in the Z axis direction may be approximately 0.1-4 μm; the length in the X axis direction may be, for example, approximately 10-300 μm.

The upper surface of the waveguide 23 contacts the protective layer 31 (see FIG. 4); the lower surface of the waveguide 23 and both end surfaces in the track width direction (Y axis direction) of the waveguide 23 contact the ninth insulating layer 32i (see FIG. 4). Herein, the waveguide 23 is configured of a material with a refractive index $n_{WG}$ that is higher than a refractive index $n_{IS}$ of the configuration material of the ninth insulating layer 32i and the protective layer. For example, in case where the wavelength $\lambda_L$ of laser light is 600 nm when the ninth insulating layer 32i and the protective layer 31 are formed of $SiO_2$ (silicon dioxide; n=1.46), the waveguide 23 may be formed of $Al_2O_3$ (alumina; n=1.63). Furthermore, when the ninth insulating layer 32i and the protective layer 31 are formed of $Al_2O_3$ (n=1.63), the waveguide 23 may be formed of $SiO_xN_y$ (n=1.7-1.85), $Ta_2O_5$ (n=2.16), $Nb_2O_5$ (n=2.33), TiO (n=2.3-2.55) or $TiO_2$ (n=2.3-2.55). When the waveguide 23 is formed of such materials, propagation loss of the laser light (waveguide light) 63 can be suppressed low due to excellent optical characteristics that the materials themselves have. Further, while the waveguide 23 functions as a core, the ninth insulating layer 32i and the protective layer 31 function as a cladding, so that the total reflection condition on all of the side surfaces is established. As a result, more laser light (waveguide light) 63 reaches the position of the buffer portion 40, and the propagation efficiency of the waveguide 23 increases.

Further, the waveguide 23 may have a multilayered structure of dielectric materials. In the multilayered structure, the closer portion to the plasmon generator 24 the layers are positioned in, the higher the refractive index n becomes. For example, such a multilayered structure is realized by sequentially laminating dielectric materials whose value of a composition ratio (X, Y) in $SiO_xN_y$ is appropriately varied. The number of laminated layers may be 8-12 layers, for example. As a result, when the laser light (waveguide light) 63 is linearly polarized light in the Z axis direction, it becomes possible to propagate the laser light (waveguide light) 63 farther toward the buffer portion 40 side in the Z axis direction. At that time, by selecting the composition of each layer in the multilayered structure, the layer thickness, and the number of layers, the preferred propagation position for the laser light (waveguide light) 63 in the Z axis direction can be obtained.

The buffer portion 40 is formed of a dielectric material having a refractive index $n_{BF}$ that is lower than the refractive index $n_{WG}$ of the waveguide 23. For example, when the wavelength $\lambda_L$ of the laser light is 600 nm and the waveguide 23 is formed of $Al_2O_3$ (alumina; n=1.63), the buffer portion 40 may be formed of $SiO_2$ (silicon dioxide; n=1.46). In addition, when the waveguide 23 is formed of $Ta_2O_5$ (n=2.16), the buffer portion 40 may be formed of $SiO_2$ (n=1.46) or $Al_2O_3$ (n=1.63). In these cases, the buffer portion 40 may be configured as a part of the ninth insulating layer 32i (see FIG. 4) formed of $SiO_2$ (n=1.46) or $Al_2O_3$ (n=1.63) and functioning as a cladding. Moreover, the length $L_{BF}$ (see FIG. 9) in the X axis direction of the buffer portion 40, which is a portion sandwiched by the lower surface of the waveguide 23 and the projection part 241, is preferably 0.5-5 μm and is preferably larger than the wavelength $\lambda_L$ of the laser light (waveguide light) 63. In this case, the buffer portion 40 has a significantly larger region compared to the so-called "focal region" formed when the laser light is focused at the buffer portion 40 and the plasmon generator 24 for being coupled in the surface plasmon mode. This enables extremely stable coupling in the surface plasmon mode. The thickness $T_{BF}$ (see FIG. 9) in the Z axis direction of the buffer portion 40 is preferably 10-200 nm. These length $L_{BF}$ and thickness $T_{BF}$ of the buffer portion 40 are important parameters for obtaining appropriate excitation and propagation of the surface plasmon.

Figure 9:
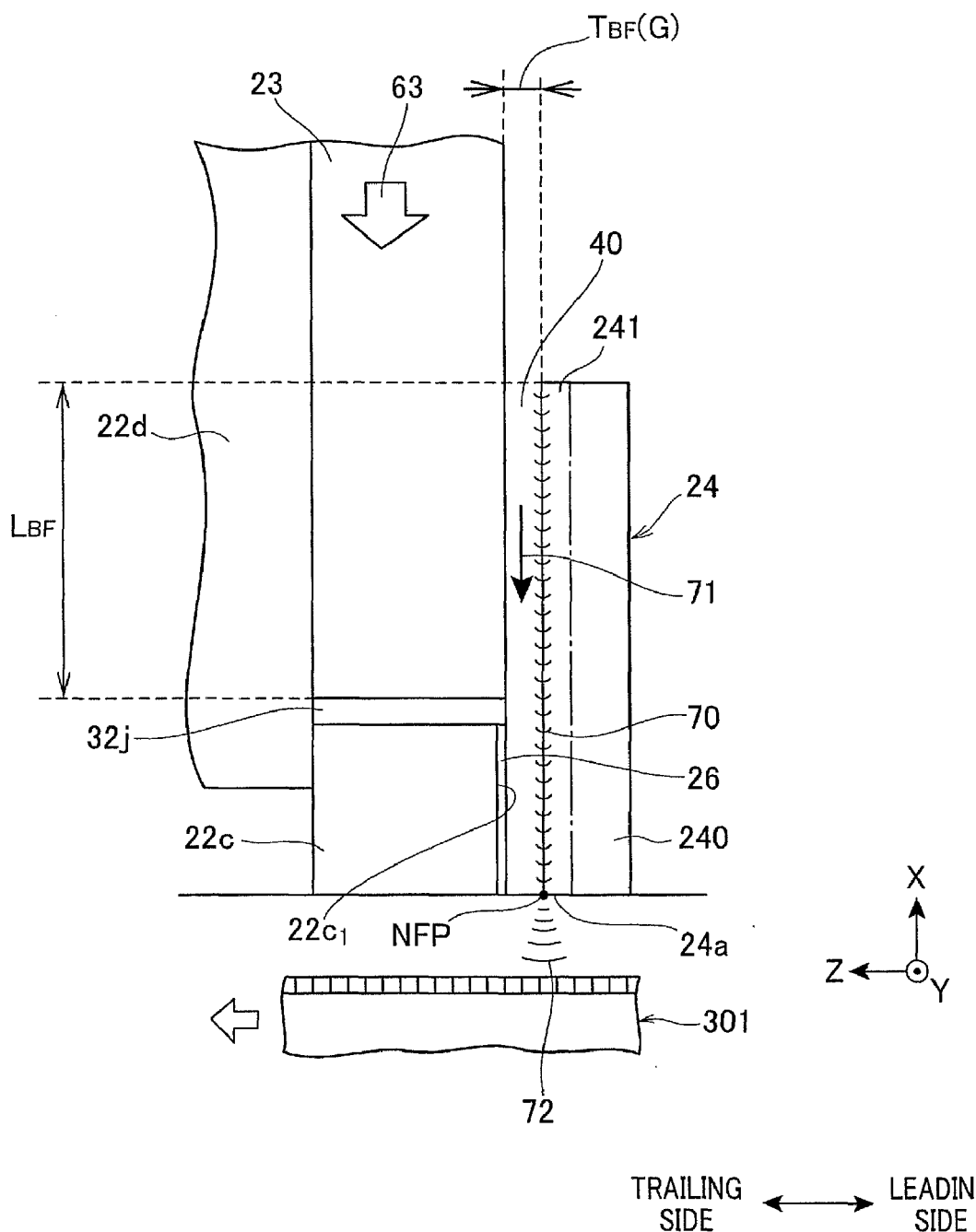
FIG. 9 is a cross-sectional view (XZ plane) schematically illustrating a thermally-assisted magnetic recording method using a surface plasmon mode of the thermally-assisted magnetic recording head according to the embodiment of the present invention.

Next, the description is given of the function of the thermally-assisted magnetic recording head 1 having the above-described configuration according to the present embodiment. FIG. 9 is a schematic view for explaining thermally-assisted magnetic recording that uses a surface plasmon mode in the thermally-assisted magnetic recording head 1 according to the present embodiment.

As illustrated in FIG. 9, during the writing to a magnetic recording layer of the magnetic disk 301 by the electromagnetic transducer element 22, laser light (waveguide light) 63 radiated from the laser diode 60 in the light source unit 50 initially propagates through the waveguide 23. Next, the laser light (waveguide light) 63 that has propagated to the vicinity of the buffer portion 40 is coupled with the optical configuration of the waveguide 23 having a predetermined refractive index $n_{WG}$, the buffer portion 40 having a predetermined refractive index $n_{BF}$, and then the plasmon generator 24 made of a conductive material such as metal or the like, and the surface plasmon mode is induced at the projection part 241 of the plasmon generator 24. That is, the laser light (waveguide light) 63 is coupled with the plasmon generator 24 in the surface plasmon mode. Actually, evanescent light is excited in the buffer portion 40 based on the optical interfacial condition between the waveguide 23, which is the core, and the buffer portion 40. Then, the surface plasmon mode is induced such that the evanescent light and fluctuation of charges excited at the metal surface (projection part 241) of the plasmon generator 24 are coupled with each other, and the surface plasmon is excited. Note, more precisely, since the surface plasmon that is elementary excitation is coupled with electromagnetic wave in this system, surface plasmon•polariton is excited. However, hereinafter, the surface plasmon•polariton is referred to as surface plasmon for short. The excitation of the surface plasmon mode can be achieved by setting the refractive index $n_{BF}$ of the buffer portion 40 smaller than the refractive index $n_{WG}$ of the waveguide 23 ($n_{BF}<n_{WG}$) and by appropriately selecting the length $L_{BF}$ of the buffer portion 40 in the X axis direction, which is in other words the length of the coupling portion of the waveguide 23 and the plasmon generator 24, and the thickness $T_{BF}$ (gap G between the waveguide 23 and the projection part 241: preferably 15-40 nm and further preferably 25-30 nm) of the buffer portion 40 in the Z axis direction.

In the excited surface plasmon mode, the surface plasmon 70 is excited on the projection part 241 of the plasmon generator 24 to propagate on the projection part 241 along the direction of an arrow 71. Since the projection part 241 does not contact the pole 22c, the projection part 241 does not receive bad effects from the pole 22c even when adjustment for efficient excitation of the surface plasmon has not done. As a result, it becomes possible to intentionally propagate the surface plasmon on the projection part 241.

As described above, by the surface plasmon 70 propagating on the projection part 241 in the direction of the arrow 71, the surface plasmon 70, which is in other words a electric field, is concentrated in the near-field light generating portion NFP on the near-field light generating end surface 24a that reaches the head part end surface 12a and that is an end of the projection part 241. As a result, the near-field light 72 is generated from the near-field light generating portion NFP. The near-field light 72 is irradiated toward the magnetic recording layer of the magnetic disk 301, reaches the surface of the magnetic disk 301, and heats the portion of the magnetic recording layer of the magnetic disk 301. Thereby, the anisotropy field (coercive force) of the portion is reduced to the value that allows the writing, and the writing is performed by the magnetic field that has been applied to the portion.

Herein, in the present embodiment, the distance MO (see FIG. 5 and FIG. 6) on the head part end surface 12a between the pole 22c and the projection part 241 of the plasmon generator 24 (upper surface of the projection part) is set to be shorter in comparison with a conventional thermally-assisted magnetic recording head (10-40 nm). Generally, when the distance MO is shortened, light (surface plasmon) propagating through the projection part 241 of the plasmon generator 24 is more likely to be absorbed by the pole 22c, and thereby there is a risk that the light intensity of the near-field light generated from the near-field light generating portion NFP may reduce. However, in the present embodiment, on the projection part opposing surface $22c_1$ of the pole 22c, the light penetration suppression part 26 is provided, and therefore it becomes possible to suppress light (surface plasmon) from being absorbed by the pole 22c and to generate near-field light with a light intensity sufficient to reduce the anisotropy field of the magnetic disk 301. As a result, according to the thermally-assisted magnetic recording head 1 of the present embodiment, it enables a steep magnetization reversal between adjacent magnetic domains of the magnetic disk 301, so that it becomes possible to satisfy the requirement of high recording density and high SN ratio.

Also, when the distance MO is short (10-40 nm), diffusion of near-field light onto the pole 22c side, the near-field light being generated from the near-field light generating portion NFP of the plasmon generator 24, is suppressed by the existence of the pole 22c. Therefore, the spot diameter of near-field light irradiated to the magnetic disk 301 may be reduced. Furthermore, from the perspective of the head part end surface 12a side, the provision of the nonmagnetic metal parts NM and NM on the both side of the pole 22c in the track width direction enables to suppress near-field light from spreading in the track width direction, and as a result the spot diameter of near-field light irradiated to the magnetic disk 301 can be further reduced. The spot diameter of near-field light can be reduced as described above, and thereby it becomes possible to comply with even higher recording density.

Furthermore, due to the generation of the near-field light 72, heating occurs in the vicinity of the near-field light generating portion NFP of the near-field light generating end surface 24a; however, the heat dissipates into the plane part 240 of the plasmon generator 24. As a result, this can contribute to suppress the excessive temperature increase in the plasmon generator 24 and to prevent an unnecessary projection of the near-field light generating end surface 24a and a significant reduction in light usage efficiency of the plasmon generator 24. Further, because the pole 22c and the plasmon generator 24 are not contacted to each other, it is possible to suppress heat dissipation into the pole 22c side and also to suppress the deterioration or the like of the pole 22c due to the heat dissipation into the pole 22c side. Note, due to generation of the near-field light 72, little heat is occasionally stored in the pole 22c; however, when the nonmagnetic metal parts NM and NM contact the both side surfaces of the pole 22c from the perspective of the head part end surface 12a side, the heat can dissipate from the pole 22c into the nonmagnetic metal parts NM and NM, and therefore it is possible to further suppress deterioration of the pole 22c, etc.

The thermally-assisted magnetic recording head having the above-described configuration can be manufactured as will be described below.

FIGS. 10A-10J are perspective views mainly schematically illustrating steps of forming the plasmon generator 24, the pole 22c, and the waveguide 23 of the thermally-assisted magnetic recording head 1 according to the present embodiment.

Figure 10A:
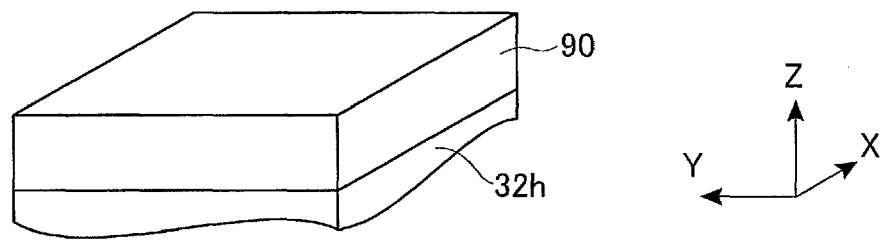
FIGS. 10A-10J are perspective views schematically illustrating steps of forming the plasmon generator, the waveguide, and the pole in the thermally-assisted magnetic recording head according to the embodiment of the present invention.
Figure 10B:
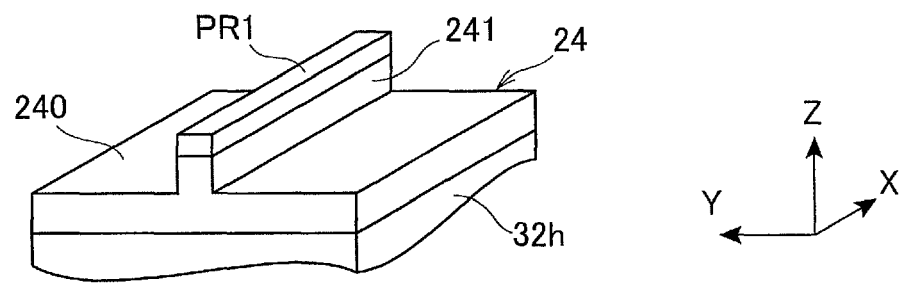

Initially, a metal layer 90 with a predetermined thickness (for example, approximately 60 nm) made of Au or Au alloy, etc. is formed by using, for example, a sputtering method on the eighth insulating layer 32h made of $Al_2O_3$, $SiO_2$, or the like (see FIG. 10A). The metal layer 90 eventually becomes the plasmon generator 24.

Next, a photoresist film PR1 is formed so as to cover the metal layer 90, and then patterning is performed. By using a remaining photoresist film PR1 as a mask, etching is performed using a dry etching method such as ion milling or the like such that the thickness of the metal layer 90 in the portion on which the photoresist film PR1 does not exist becomes a predetermined thickness (for example, approximately 30 nm) (see FIG. 10B). By doing so, the plasmon generator 24 having the plane part 240 and the projection part 241 is formed.

Figure 10C:
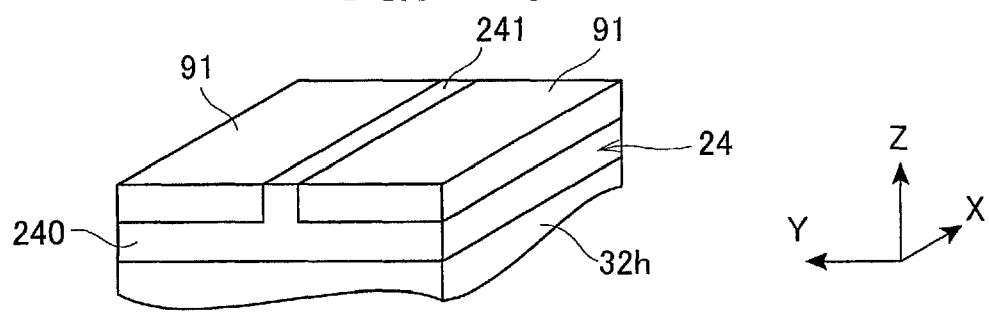
Figure 10D:
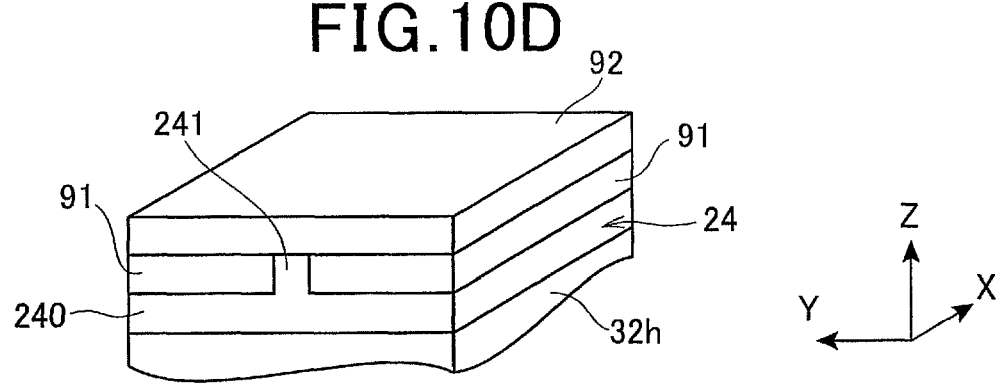

Next, $Al_2O_3$, $SiO_2$, or the like is refilled so as to cover portions above the plane part 240 of the plasmon generator 24 to form insulating layers 91, and the remaining photoresist film PR1 is peeled (see FIG. 10C). Then, an insulating layer 92 formed of $Al_2O_3$, $SiO_2$, or the like is formed on the upper surface of the projection part 241 and the insulating layers 91 by using, for example, a sputtering method (see FIG. 10D). A portion of the insulating layer 92 eventually becomes a gap between the waveguide 23 and the plasmon generator 24 (projection part 241), which is the buffer portion 40. Because the thickness of the insulating layer 92 affects the coupling efficiency of the laser light (waveguide light) 63 at the projection part 241 of the plasmon generator 24, it is required to control a film formation thickness of the insulating layer 92 to be an appropriate thickness.

Figure 10E:
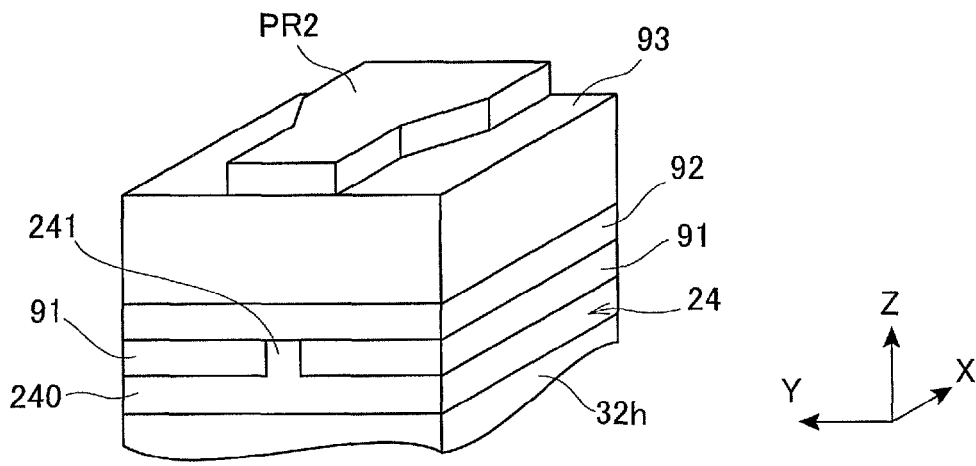
Figure 10F:
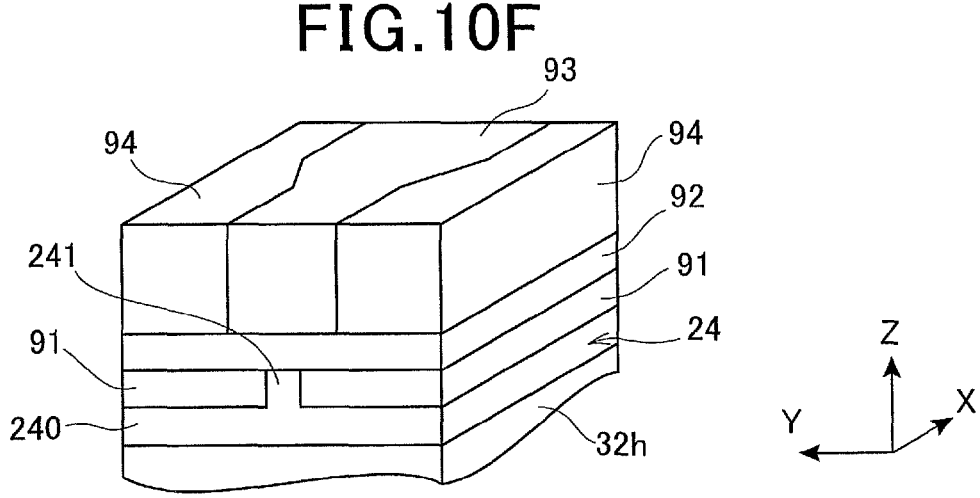

Next, after forming a $TaO_x$ layer 93 on the insulating layer 92 and forming a photoresist film PR2 on the $TaO_x$ layer 93, patterning is performed (see FIG. 10E). The $TaO_x$ layer 93 positioned directly below the photoresist film PR2 that remains as described above eventually becomes the waveguide 23.

Next, by using the remaining photoresist film PR2 as a mask, etching is performed on the portions of the $TaO_x$ layer 93 on which the photoresist film PR2 does not exist using a dry etching method such as ion milling, or the like. Then, the remaining photoresist film PR2 is peeled, insulating layers 94 formed of $Al_2O_3$, $SiO_2$, or the like are formed in the portions where the $TaO_x$ layer 93 has been etched using, for example, a sputtering method or the like, and planarization is performed using a polishing method such as chemical mechanical polishing (CMP) or the like (see FIG. 10F).

Figure 10G:
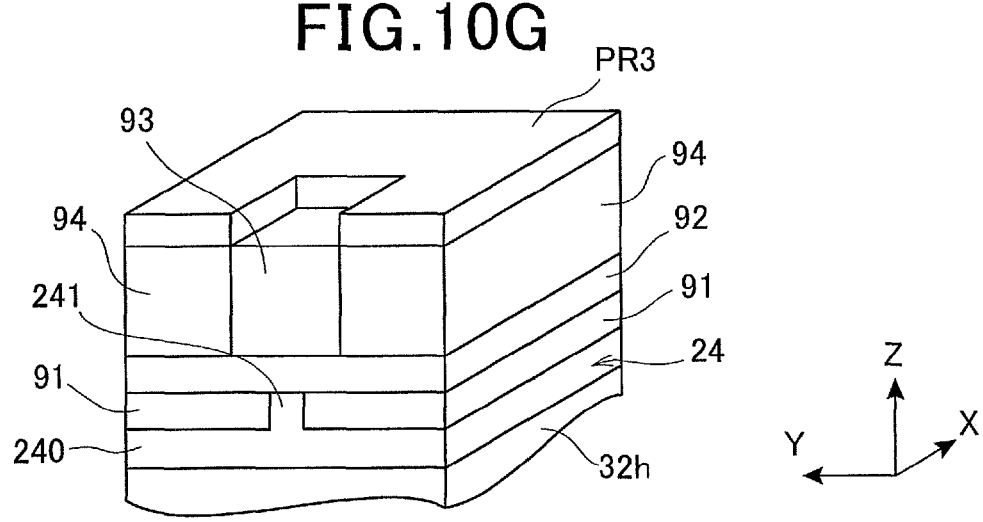
Figure 10H:
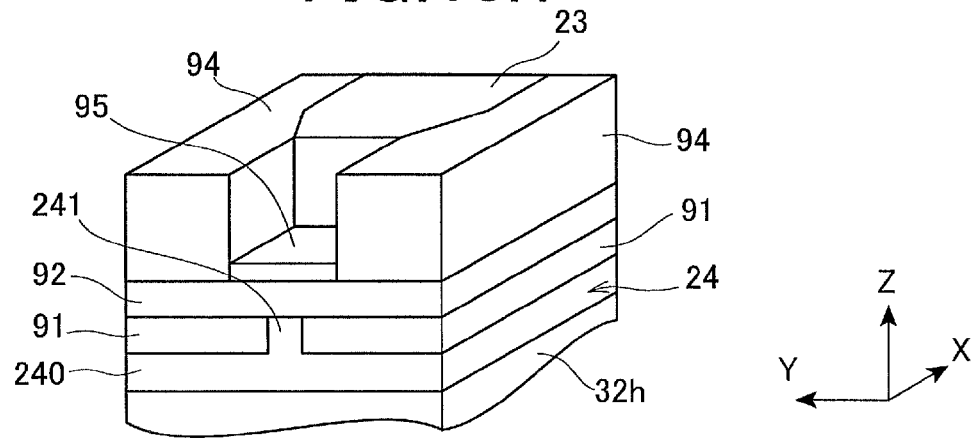
Figure 10I:
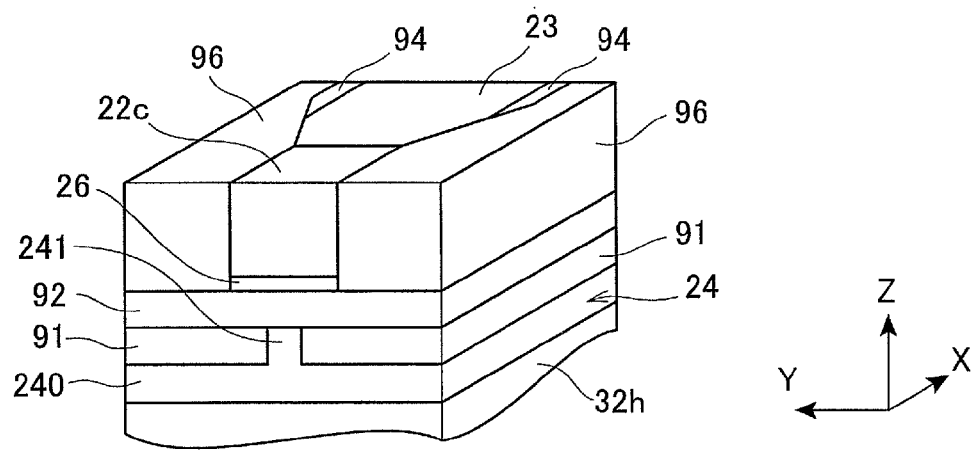

Next, after forming a photoresist film PR3 on the remaining $TaO_x$ layer 93 and the remaining insulating layers 94, patterning is performed (see FIG. 10G). Next, etching is performed on a portion of the $TaO_x$ layer 93 by a dry etching method such as ion milling or the like, a metal thin film 95 made of Al or the like is formed on the exposed insulating layer 92 by sputtering or the like, and then the remaining photoresist film PR3 is peeled (see FIG. 10H). By doing so, it is possible to form the waveguide 23 and the light penetration suppression part 26 positioned on the back side of the pole 22c in the X axis direction (height direction).

Next, a magnetic material such as FeCo or the like is plated on the light penetration suppression part 26, planarization is performed by using a polishing method such as chemical mechanical polishing (CMP) or the like, and thereby the pole 22c is formed. Next, patterning is performed after forming a photoresist film on the pole 22c, the waveguide 23, and the insulating layers 94, etching is performed on portions of the insulating layers 94, the insulating layer 92, and the insulating layers 91 by using a dry etching method such as ion milling, the plane part 240 of the plasmon generator 24 and the both side surfaces of the pole 22c from the perspective of the head part end surface 12a side are exposed, a nonmagnetic metal 96 such as Cu or the like is plated on the exposed plane part 240, and planarization is performed by using a polishing method such as chemical mechanical polishing (CMP) or the like (see FIG. 10I). By doing so, it is possible to form the nonmagnetic metal parts NM and NM contacting the both side surfaces of the pole 22c in the Y axis direction from the perspective of the head part end surface 12a side and the plane part 240 of the plasmon generator 24.

Figure 10J:
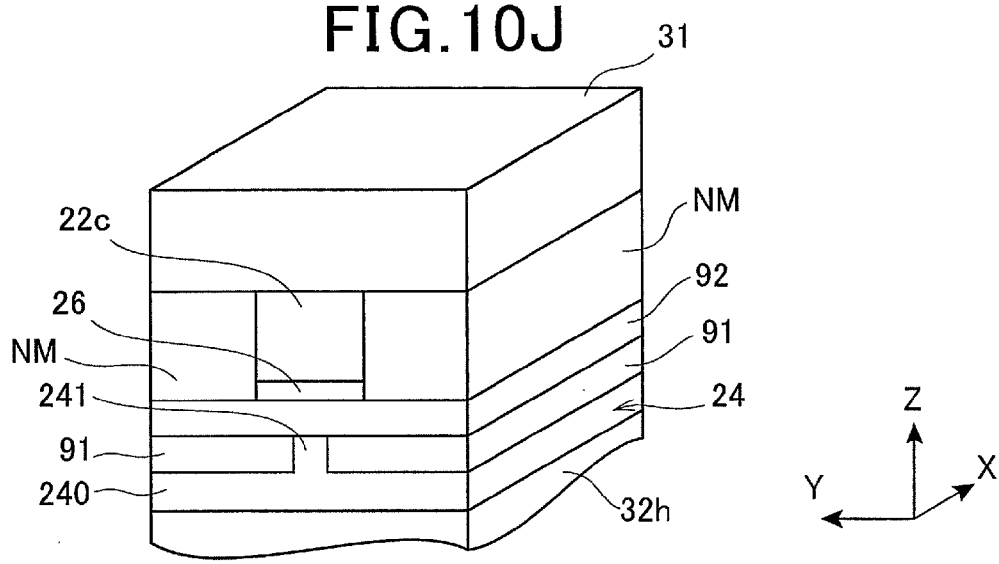

Lastly, a magnetic material such as FeCo or the like is plated in a manner of covering the pole 22c to form the upper yoke layer 22d, the protective layer 31 formed of $Al_2O_3$ (alumina) or $SiO_2$ is formed by using, for example, a sputtering method or the like, and then planarization is performed by using a polishing method such as chemical mechanical polishing (CMP) or the like (see FIG. 10J). As described above, it is possible to manufacture the head part 12 in the present embodiment.

The above-described embodiment is provided for a clear understanding of the present invention, and is not provided to limit the present invention. Therefore, each of the elements disclosed in the above-described embodiment also includes any design changes and equivalents thereof that belong to the technical scope of the present invention.

Also, in the thermally-assisted magnetic recording head 1 according to the above-described embodiment, the shape of the projection part 241 is rectangular when the projection part 241 projected from the plane part 240 of the plasmon generator 24 is viewed from the head part end surface 12a side; however, the present invention is not limited to such form. The shape of the projection part 241 when the projection part 241 is viewed from the head part end surface 12a side may be substantially trapezoidal or substantially invertedly trapezoidal; the shape of an angle at the intersection of the side (side in the Z axis direction) of the projection part 241 when the projection part 241 is viewed from the head part end surface 12a side and the plane part 240 may be curved.

In the thermally-assisted magnetic recording head 1 according to the above-described embodiment, the nonmagnetic metal parts NM and NM are formed upright on the plane part 240 of the plasmon generator 24; however, the present invention is not limited to such form. The nonmagnetic metal parts NM and NM need only contact at least the both side surfaces of the pole 22c from the perspective of the head part end surface 12a side, and the plane part 240 and the nonmagnetic metal parts NM and NM may be separated.

EXAMPLES

Hereinafter, further detailed description of the present invention will be given showing experimental examples; however, the present invention is not particularly limited to the experimental examples, which will be described below.

Experimental Example 1

Example 1

By using the thermally-assisted magnetic recording head 1 having the configuration illustrated in FIGS. 4-7, regarding the relation between the near-field light peak intensity and the distance MO between the pole 22c and the projection part 241 of the plasmon generator 24, simulation analysis experiment was performed (example 1).

The simulation analysis experiment was performed using a finite-difference time-domain method (FDTD method) of three dimensions, which is an electromagnetic field analysis.

As the thermally-assisted magnetic recording head 1 in the example 1, a model was adopted. In the model, the pole 22c was formed of a FeCo alloy, the waveguide 23 was formed of $Ta_2O_5$ (refractive index $n_{WG}$=2.15), the protective layer 31 and the buffer portion 40 (the ninth insulating layer 32i) were formed of $SiO_2$ (refractive index n=1.46), the plasmon generator 24 was formed of Au, the nonmagnetic metal part NM was formed of Cu, and the light penetration suppression part 26 was formed of Al.

In the model, a projection height $T_{PGC}$ of the projection part 241 of the plasmon generator 24 was set at 30 nm; a height $T_{PG}$ from the lower surface of the plane part 240 to the upper surface of the projection part 241 was set at 130 nm; a width $W_{PGC}$ of the projection part 241 in the Y axis direction on the near-field light generating end surface 24a was set at 30 nm; a length $H_{PG}$ of the plasmon generator 24 in the X axis direction was set at 1.2 μm; the gap G (thickness $T_{BF}$ of the buffer portion 40 in the Z axis direction) between the waveguide 23 and the projection part 241 was set at 25 nm; a length of the nonmagnetic metal part NM in the X axis direction was set at 5 μm; and the wavelength of laser light (waveguide light) was set at 797 nm. Furthermore, the winding number of the writing coil 22b was set at 3; input current value was set at 40 mA.

Then, while the distance MO between the pole 22c on the head part end surface 12a and the projection part 241 (upper surface of the projection part) of the plasmon generator 24 was varied in the range of 5-45 nm, the relation between the near-field light peak intensity and the distance MO was calculated by simulation analysis.

Example 2

With respect to the thermally-assisted magnetic recording head 1 that has the same configuration as the example 1 other than that the nonmagnetic metal parts NM and NM were not provided in, regarding the relation between the near-field light peak intensity and the distance MO (5-45 nm), simulation analysis experiment was performed in the same way as the example 1 (example 2).

Comparative Example 1

Figure 11:
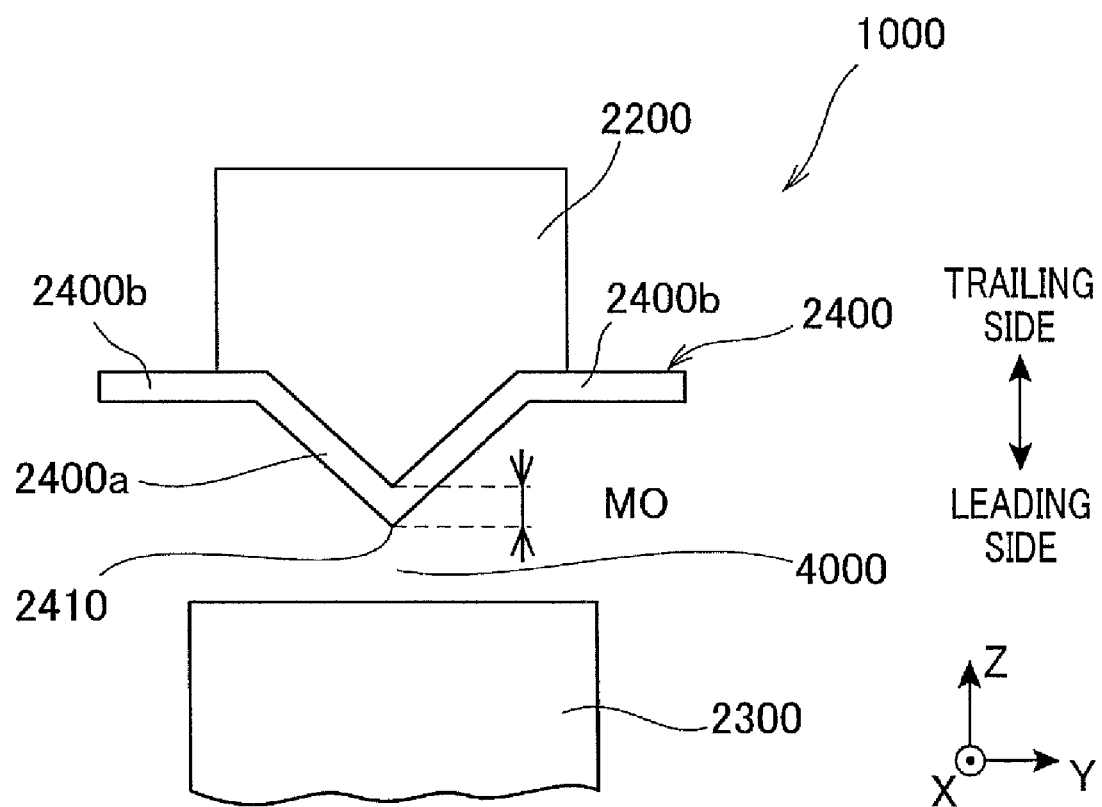
FIG. 11 is a plan view from the perspective of the air bearing surface side, the view schematically illustrating a configuration of a thermally-assisted magnetic recording head according to a comparative example 1 that is used in an experimental example 1.

As illustrated in the plan view from the perspective of the head part end surface side in FIG. 11, with respect to a conventional thermally-assisted magnetic recording head 1000 provided with a waveguide 2300, a plasmon generator 2400 provided above the waveguide 2300 with an insulating layer (buffer portion) 4000 intervened between the waveguide 2300 and the plasmon generator 2400, and a pole 2200 provided on the plasmon generator 2400, regarding the relation between the near-field light peak intensity and the distance MO, simulation analysis experiment was performed in the same way as the example 1 (comparative example 1).

In the thermally-assisted magnetic recording head 1000 of the comparative example 1, the plasmon generator 2400 has a substantially V-shaped part 2400a that has a substantial V-shape from the perspective of the head part end surface side, extended parts 2400b that continue to upper end parts of the substantially V-shaped part 2400a and that extend in the Y axis direction, and a propagation edge 2410 that is positioned in an apex of the substantially V-shaped part 2400a and that elongates in the X axis direction. Inside the substantially V-shaped part 2400a of the plasmon generator 2400, one part of the pole 2200 is embedded.

Note, as the thermally-assisted magnetic recording head 1000 of the comparative example 1, a model was adopted. In the model, the pole 2200 was formed of a FeCo alloy, the waveguide 2300 was formed of $Ta_2O_5$ (refractive index $n_{WG}$=2.15), the buffer portion 4000 was formed of $SiO_2$ (refractive index n=1.46), and the plasmon generator 24 was formed of Au.

In the model, an angle that forms an apex of the pole 2200 embeded inside the substantially V-shaped part 2400a of the plasmon generator 2400 was set at 90 degree. Also, the gap G (thickness of the buffer portion 4000 in the Z axis direction) between the waveguide 2300 and the propagation edge 2410 was set at 25 nm, and the wavelength of laser light (waveguide light) was set at 797 nm. Furthermore, the winding number of the writing coil 22b was set at 3, and input current value was set at 40 mA.

Then, while the distance MO between the propagation edge 2410 on the head part end surface and the apex of the pole 2200 embedded inside the substantially V-shaped part 2400a was varied in the range of 20-50 nm, the relation between the near-field light peak intensity and the distance MO was calculated by simulation analysis in the same way as the example 1.

Figure 12:
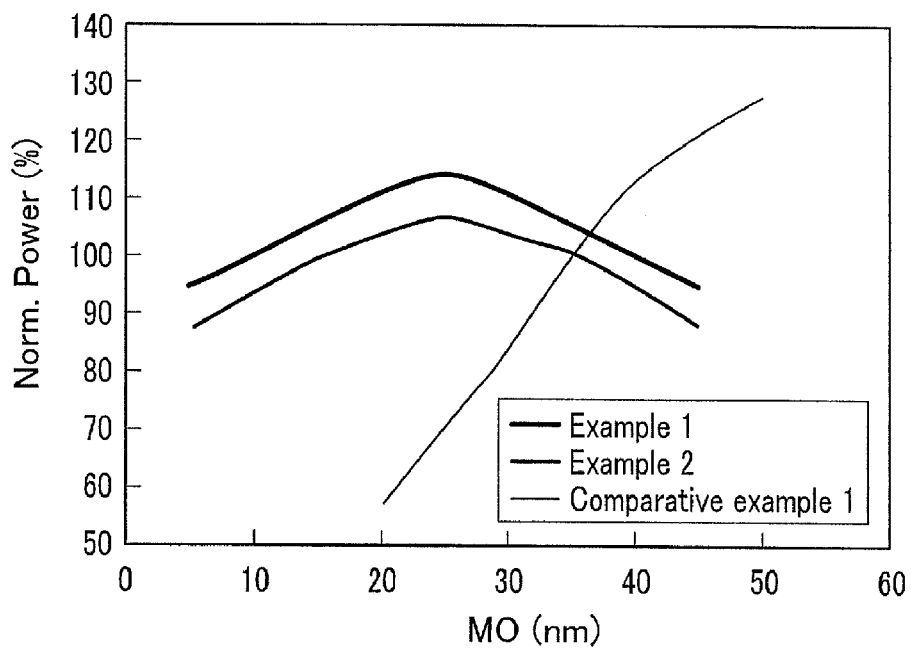
FIG. 12 is a graph illustrating the simulation analysis experiment result of the experimental example 1.

FIG. 12 illustrates the simulation analysis experiment results of the example 1, the example 2, and the comparative example 1. FIG. 12 is a graph illustrating the simulation analysis experiment results. Note, in the graph illustrated in FIG. 12, the Y axis is indicated using relative values when the near-field light peak intensity when the distance MO in the thermally-assisted magnetic recording head 1000 of the comparative example 1 is 35 nm is defined as 100%.

As is clear from the graph in FIG. 12, in the thermally-assisted magnetic recording head 1 of the example 1, when the distance MO between the pole 22c and the projection part 241 of the plasmon generator 24 was set to be 10-40 nm, an increasing effect of the near-field light peak intensity was recognized.

Also, in the thermally-assisted magnetic recording head 1 of the example 2, when the distance MO between the pole 22c and the projection part 241 of the plasmon generator 24 was set to be 16-36 nm, an increasing effect of the near-field light peak intensity was recognized.

Further, from the simulation analysis results of the above-described example 1 and example 2, by providing the nonmagnetic metal parts NM and NM on the both side surfaces of the pole 22c in a contacting manner from the perspective of the head part end surface 12a side, it was presumptively recognized that deffusion of near-field light in the track width direction can be suppressed and the spot diameter of near-field light can be reduced.

Experimental Example 2

In a model used, for the example 1 and the example 2, the distance MO between the pole 22c and the projection part 241 of the plasmon generator 24 was set at 25 nm, and for the comparative example 1, the distance MO between the propagation edge 2410 on the head part end surface and the apex of the pole 2200 embedded inside the substantially V-shaped part 2400a was set at 35 nm. With the model, spot diameters (in a cross-track direction (CT) and in a down-track direction (DT)) of near-field light were calculated by simulation analysis. The simulation analysis experiment was performed by using a finite-difference time-domain method (FDTD method) of three dimensions, which is an electromagnetic field analysis. The results are shown in Table 1. Note, in order that the peak intensities of near-field light in all of the thermally-assisted magnetic recording heads in the example 1, the example 2, and the comparative example 1 are almost the same, the distance MO in the example 1 and the example 2 was set at 25 nm, and in contrast the distance MO in the comparative example 1 was set at 35 nm.

TABLE 1

|  | Max$|E|^2$ | Spot Size CT | Spot Size DT | Norm. Power |
|---|---|---|---|---|
| Example 1 | 0.577 | 47.5 | 40.6 | 114% |
| Example 2 | 0.627 | 57.5 | 57.5 | 106% |
| Comparative Example 1 | 0.569 | 92.5 | 77.5 | 100% |

As is clear from Table 1, it was confirmed that, in the thermally-assisted magnetic recording heads 1 of the example 1 and the example 2 compared to the thermally-assisted magnetic recording head 1000, it was possible to reduce a spot diameter of near-field light. Also, it was confirmed that, in the thermally-assisted magnetic recording head 1 of the example 1 in which the nonmagnetic metal parts NM and NM are provided so as to contact the both side surfaces of the pole 22c when viewed from the head part end surface 12a side, it is possible to reduce a spot diameter of near-field light due to the function of the nonmagnetic metal parts NM and NM.

Experimental Example 3

By using the thermally-assisted magnetic recording head 1 of the example 1, regarding the relation between SNR and the thickness $T_{LPI}$ of the light penetration suppression part 26 and the relation between the spot diameter of near field light and the thickness $T_{LPI}$ of the light penetration suppression part 26 while thickness $T_{LPI}$ of the light penetration suppression part 26 was varied in the range of 0-15 nm, simulation analysis experiment was performed in the same way as the example 1. In the simulation analysis experiment, in the case where the thickness $T_{LPI}$ of the light penetration suppression part 26 is 0 nm (light penetration suppression part 26 is not provided), the distance MO between the pole 22c and the projection part 241 (upper surface of the projection part) of the plasmon generator 24 was set at 25 nm. Also, when the thickness $T_{LPI}$ of the light penetration suppression part 26 was varied, the pole 22c was slided upward (in the trailing side) by the distance of the thickness $T_{LPI}$ and arranged at the position. In other words, the distance between the projection part 241 (upper surface of the projection part) of the plasmon generator 24 and the light penetration suppression part 26 was set to be constant at 25 nm.

Figure 13:
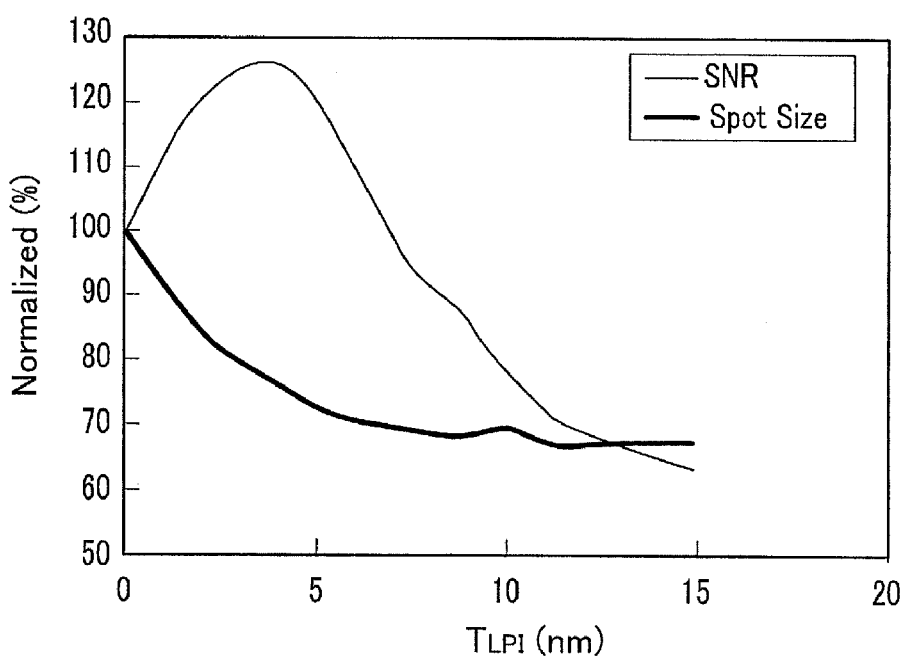
FIG. 13 is a graph illustrating the simulation analysis experiment result of an experimental example 3.

The result is shown in the graph of FIG. 13. Note, in FIG. 13, the Y-axis is indicated using relative values when SNR and spot diameter of the thermally-assisted magnetic recording head in which the thickness $T_{LPI}$ of the light penetration suppression part 26 is 0 nm, that is, the light penetration suppression part 26 is not provided, was defined as 100%

As illustrated in FIG. 13, it was confirmed that in the thermally-assisted magnetic recording head 1 of the example 1, regarding SNR, the thickness $T_{LPI}$ of the light penetration suppression part 26 is preferably 0.5-6.25 (SNR≧105%), further preferably 1.25-5.5 nm (SNR≧115%). Also, regarding the spot diameter of near-field light, it was confirmed that the spot diameter was reduced as the thickness $T_{LPI}$ of the light penetration suppression part 26 was thickened.

What is claimed is:

1. A thermally-assisted magnetic recording head, comprising:
   a pole that generates a writing magnetic field from an end surface that forms a part of an air bearing surface that opposes a magnetic recording medium;
   a waveguide through which light for exciting surface plasmon propagates; and
   a plasmon generator that couples to the light in a surface plasmon mode to generate near-field light from a near-field light generating end surface that forms a part of the air bearing surface, wherein
   the waveguide is arranged on a back side of the pole along a direction perpendicular to the air bearing surface from the perspective of the air bearing surface side,
   the plasmon generator has a plane part and a projection part that is projected from the plane part to the waveguide side and that opposes the pole and the waveguide with a predetermined gap therebetween,
   the pole has a projection part opposing surface that opposes the projection part, and
   the distance between the projection part opposing surface and the projection part is 10-40 nm.

2. The thermally-assisted magnetic recording head according to claim 1, further comprising:
   a nonmagnetic metal part that contacts the pole.

3. The thermally-assisted magnetic recording head according to claim 2, further comprising
   another nonmagnetic metal part that contacts the pole, wherein
   the nonmagnetic metal parts are arranged to contact both of the side surfaces of the pole in a track width direction from the perspective of the air bearing surface side.

4. The thermally-assisted magnetic recording head according to claim 2, wherein
   the nonmagnetic metal part contacts the plane part of the plasmon generator.

5. The thermally-assisted magnetic recording head according to claim 1, wherein a light penetration suppression part that may suppress penetration of the near-field light is provided on the projection part opposing surface.

6. The thermally-assisted magnetic recording head according to claim 5, wherein
the light penetration suppression part is a metal thin film with a thickness of 0.5-6.25 nm.

7. The thermally-assisted magnetic recording head according to claim 5, wherein
the light penetration suppression part is configured of a metal material whose attenuation coefficient is larger than that of a metal material configuring the plasmon generator.

8. The thermally-assisted magnetic recording head according to claim 7, wherein
the metal material that configures the light penetration suppression part is aluminum, magnesium, indium, or tin, or an alloy material including at least one type of these metals.

9. The thermally-assisted magnetic recording head according to claim 1, wherein
the projection part continues from the air bearing surface along the direction perpendicular to the air bearing surface.

10. The thermally-assisted magnetic recording head according to claim 1, wherein the shape of the projection part is a substantially trapezoidal shape that is surrounded by
a short side that is positioned on the air bearing surface,
a long side that is positioned on the back side with respect to the short side along the direction perpendicular to the air bearing surface and that is substantially parallel to the short side, and
two inclined sides that respectively continue to end parts of the short side and end parts of the long side.

11. The thermally-assisted magnetic recording head according to claim 10, wherein
an angle formed by the direction perpendicular to the air bearing surface and one of the inclined sides is less than 10 degree.

12. The thermally-assisted magnetic recording head according to claim 1, wherein
the shape of the projection part includes a substantial V-shape formed by an apex that is positioned on the air bearing surface and two inclined sides that spread to each other from the apex toward the back side along the direction perpendicular to the air bearing surface.

13. A head gimbal assembly, comprising:
the thermally-assisted magnetic recording head according to claim 1; and
a suspension that supports the thermally-assisted magnetic recording head.

14. A magnetic recording device, comprising:
a magnetic recording medium;
the thermally-assisted magnetic recording head according to claim 1; and
a positioning device that supports the thermally-assisted magnetic recording head and that also positions the thermally-assisted magnetic recording head with respect to the magnetic recording medium.

* * * * *